(12) United States Patent
Tsuchi

(10) Patent No.: US 11,955,095 B2
(45) Date of Patent: Apr. 9, 2024

(54) OUTPUT CIRCUIT FOR LIQUID CRYSTAL DISPLAY DRIVER PROVIDING HIGH RELIABILITY AND REDUCED AREA SELECTIVELY OUTPUTTING POSITIVE AND NEGATIVE VOLTAGE SIGNALS

(71) Applicant: LAPIS Technology Co., Ltd., Yokohama (JP)

(72) Inventor: Hiroshi Tsuchi, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 17/696,838

(22) Filed: Mar. 16, 2022

(65) Prior Publication Data
US 2022/0319454 A1   Oct. 6, 2022

(30) Foreign Application Priority Data

Mar. 30, 2021   (JP) ................ 2021-058312

(51) Int. Cl.
*G09G 3/36*   (2006.01)
*G02F 1/1362*   (2006.01)

(52) U.S. Cl.
CPC ......... *G09G 3/36* (2013.01); *G02F 1/136286* (2013.01); *G09G 2300/0871* (2013.01); *G09G 2330/02* (2013.01)

(58) Field of Classification Search
CPC ...... G09G 3/36; G09G 3/3611; G09G 3/3614; G09G 3/3622; G09G 3/3625; G09G 3/364; G09G 3/3644; G09G 3/3648; G09G 3/3674; G09G 3/3677; G09G 3/3681; G09G 3/3685; G09G 3/3688; G09G 3/3692; G09G 3/3696; G09G 2300/0871

USPC .................................................. 345/87–104
See application file for complete search history.

(56) References Cited

U.S. PATENT DOCUMENTS

| | | | | |
|---|---|---|---|---|
| 8,970,460 B2* | 3/2015 | Yaguma | ............... | G09G 3/3696 345/87 |
| 11,756,501 B2* | 9/2023 | Tsuchi | ................. | G09G 3/3696 345/87 |
| 2010/0097361 A1* | 4/2010 | Oku | ..................... | G09G 3/3688 345/208 |

(Continued)

FOREIGN PATENT DOCUMENTS

JP   2008102211   5/2008

*Primary Examiner* — Ke Xiao
*Assistant Examiner* — Nelson Lam
(74) *Attorney, Agent, or Firm* — JCIPRNET

(57) ABSTRACT

The disclosure provides an output circuit, a display driver including the output circuit and a display device. The disclosure includes a PMOS transistor switch that outputs a positive voltage signal from an output terminal when it is turned on, an NMOS transistor switch that outputs a negative voltage signal from the output terminal when it is turned on, and a voltage control circuit that supplies a voltage obtained by shifting the level of a voltage of a source or a drain when the PMOS transistor switch is turned on to a high potential side to a back gate of the PMOS transistor switch and supplies a voltage obtained by shifting the level of a voltage of a source or a drain when the NMOS transistor switch is turned on to a low potential side to a back gate of the NMOS transistor switch.

20 Claims, 17 Drawing Sheets

(56) References Cited

U.S. PATENT DOCUMENTS

2013/0120352 A1* 5/2013 Peng .................... G09G 5/00
   345/212
2018/0366077 A1* 12/2018 Higuchi ............. H03F 3/45269

* cited by examiner

OUTPUT CIRCUIT FOR LIQUID CRYSTAL DISPLAY DRIVER PROVIDING HIGH RELIABILITY AND REDUCED AREA SELECTIVELY OUTPUTTING POSITIVE AND NEGATIVE VOLTAGE SIGNALS

CROSS-REFERENCE TO RELATED APPLICATION

This application claims priority under 35 USC 119 from Japanese Patent application No. 2021-058312 filed on Mar. 30, 2021, the disclosure of which is incorporated by reference herein.

BACKGROUND

Technical Field

The disclosure relates to an output circuit that outputs positive and negative voltages, a display driver that drives a display panel, and a display device.

Related Art

Currently, as a main display device, a liquid crystal display device using an active matrix drive type liquid crystal panel as a display device is generally known.

On the liquid crystal panel, a plurality of data lines that each extend in a vertical direction of a 2D screen and a plurality of gate lines that each extend in a horizontal direction of the 2D screen are alternately arranged. In addition, a pixel part connected to a data line and a gate line is formed at each intersection between the plurality of data lines and the plurality of gate lines. The liquid crystal display device includes such a liquid crystal panel and a data driver that supplies a gradation data signal (referred to as a gradation voltage signal) having an analog voltage value corresponding to a luminance level of each pixel to a data line with a data pulse in one horizontal scan period unit. In order to prevent deterioration of the liquid crystal panel, the data driver performs polarity inversion driving in which a positive gradation data signal and a negative gradation data signal are alternately supplied to the liquid crystal panel at predetermined frame periods.

Providing a switch group that receives a positive drive voltage and a negative drive voltage corresponding to a gradation data signal, alternately selects one of them, and outputs it to a liquid crystal panel as an output circuit that performs such polarity inversion driving is proposed (for example, refer to SW1 to SW12 in FIG. 9 to FIG. 11 in Patent Document 1, Japanese Patent Application Laid-Open No. 2008-102211).

In the output circuit described in Patent Document 1, a state in which a positive drive voltage (5 V) is output from an output pad OUT1 (the state of FIG. 9 in the same document) is switched to a state in which a negative drive voltage (−5 V) is output from an output pad OUT1 (the state of FIG. 11 in the same document) using switches SW1 to SW12. In addition, in performing such polarity switching, in the output circuit described in Patent Document 1, as shown in FIG. 10 in the same document, one end of each switch is temporarily set to the state of 0 V and the state is then switched to that of FIG. 11 in the same document. Thereby, a withstand voltage of each switch can be formed with an element having a low withstand voltage that is ½ of a liquid crystal drive voltage range.

In Patent Document 1 (FIG. 9 to FIG. 11 in the same document), output selection switches (SW5, SW6, SW7, and SW8) connected to the OUT1 and 2 can be elements having a low withstand voltage of ½ of a liquid crystal drive voltage range at both ends, but when the switch is composed of a transistor switch having a low withstand voltage that is ½ of a liquid crystal drive voltage range, a complementary switch in which a P-channel type and an N-channel type are combined is not suitable for use, and needs be composed of a single conductive transistor switch. The reason for this will be described below.

For example, a voltage value range of the positive drive voltage (gradation voltage signal) is VGND (0 V) to VDDH (5 V), and the voltage value range of the negative drive voltage (gradation voltage signal) is VDDL (−5 V) to VGND (0 V).

Here, first, a case in which the output selection switch SW5 that outputs a positive drive voltage shown in Patent Document 1 (FIG. 9 to FIG. 11 in the same document) is composed of an N-channel type transistor switch is considered.

Since the N-channel type transistor switch SW5 outputs the positive drive voltage supplied to a first terminal, the positive power supply voltage VDDH is supplied to the control end thereof at the maximum. Here, when the output terminal OUT1 connected to a second terminal of the N-channel type transistor switch SW5 is driven to the reference power supply voltage VGND by inverting the polarity from a negative polarity to a positive polarity, if the output terminal OUT1 is not sufficiently close to the reference power supply voltage VGND from the negative drive voltage, there is a risk of the voltage difference between the control end of the N-channel type transistor switch SW5 and the output terminal OUT1 connected to the second terminal exceeding the withstand voltage. In order to avoid this risk, it is necessary to secure a sufficient drive time for the reference power supply voltage VGND to the output terminal OUT1 when the polarity is inverted, and high-speed driving is difficult under operation conditions with a short output period. In addition, when the voltage value of the positive drive voltage is close to the positive power supply voltage VDDH, even if the positive power supply voltage VDDH is supplied to the control end of the N-channel type transistor switch SW5, the voltage range within the threshold voltage of the N-channel type transistor cannot be output from the positive power supply voltage VDDH.

Next, a case in which the output selection switch SW5 is composed of a P-channel type transistor switch will be considered.

Since the P-channel type transistor switch SW5 outputs a positive drive voltage supplied to the first terminal, control is performed such that a voltage within the withstand voltage on the low voltage side with respect to the positive drive voltage is supplied to the control end. In this case, there is no risk of the voltage difference between the control end of the P-channel type transistor switch SW5 and the output terminal OUT1 connected to the second terminal exceeding the withstand voltage. In addition, if the voltage supplied to the control end of the P-channel type transistor switch SW5 is appropriately controlled with respect to the positive drive voltage, any positive drive voltage can be output from the P-channel type transistor switch SW5.

Therefore, it is optimal that the output selection switch that outputs a positive drive voltage be composed of a P-channel type transistor switch alone. Similarly, it is optimal that the output selection switch that outputs a negative drive voltage be composed of an N-channel type transistor switch alone.

Incidentally, the data driver of the display device is generally composed of an MOS transistor circuit on a silicon LSI, and an output circuit including the output selection switch is also composed of an MOS transistor circuit. Since the output selection switch of the MOS transistor includes a back gate, the withstand voltage between the back gate terminal and other terminals needs to be ½ of a liquid crystal drive voltage. The voltage supplied to the back gate terminal is generally defined as the upper limit side power supply voltage in a voltage range of the source terminal or common connection to the source terminal for the PMOS transistor, and as the lower limit side power supply voltage in a voltage range of the source terminal or common connection to the source terminal for the NMOS transistor.

Here, a case in which the output selection switch that outputs a positive drive voltage is composed of a PMOS transistor switch alone is considered.

When the voltage applied to the back gate of the PMOS transistor switch is the positive power supply voltage VDDH on the upper limit value side in the voltage range of the source terminal, and the gate terminal of the PMOS transistor switch has a voltage lower than the reference power supply voltage VGND, there is a risk of the voltage difference between the back gate terminal and the gate terminal exceeding the withstand voltage.

On the other hand, when the back gate terminal of the PMOS transistor switch is commonly connected to the source terminal, there is no risk of an over-withstand voltage. Similarly, even if the output selection switch that outputs a negative drive voltage is composed of an NMOS transistor switch alone, when the back gate terminal of the NMOS transistor switch is commonly connected to the source terminal, there is no risk of an over-withstand voltage.

However, when the PMOS transistor switch is a single conductive MOS transistor switch in which the source terminal and the back gate terminal are commonly connected, there is a mode in which a current flows out of the transistor due to the operation of the parasitic bipolar transistor.

This will be described. Here, for convenience of explanation, the output circuit is formed on a P-type semiconductor substrate.

FIG. 1 is a cross-sectional view showing a PMOS transistor Qs as an output selection switch and a parasitic bipolar transistor formed on the PMOS transistor Qs.

The PMOS transistor Qs is formed in, for example, an N-type well NW formed on the surface of the P-type semiconductor substrate PS. The gate G of the PMOS transistor Qs is composed of a gate insulating film Go and a gate electrode Gp laminated on the P-type semiconductor substrate PS. A drain D and a source S are composed of high-concentration P-type diffusion regions Rd and Rs arranged at intervals of gate lengths from each other in the N-type well NW. In the vicinity of the source in the N-type well NW, a high-concentration N-type diffusion region BG is formed as a back gate end for applying a potential to the back gate of the PMOS transistor Qs. The back gate end and the source S are commonly connected to the output end of the positive-polarity amplifier AMP that generates and outputs a positive drive voltage via a wiring. For example, the drain D is connected to a data line load LOD as a capacitive load of a liquid crystal panel via a wiring. In addition, in the vicinity of the N-type well NW on the surface of the P-type semiconductor substrate PS, a high-concentration P-type diffusion region Rc for applying a negative power supply voltage VDDL to the P-type semiconductor substrate PS is formed.

Hereinafter, as shown in FIG. 1, the operation when the output selection switch is composed of a single conductive MOS transistor in which the source S (Rs) and the back gate end (BG) are commonly connected will be described. Here, for drive of a liquid crystal panel, column inversion driving will be exemplified. In the column inversion driving, drive voltages of the same polarity are supplied during a data period within one frame.

For example, when the drive voltage on the low voltage side is supplied from the positive-polarity amplifier AMP to the data line load LOD via the PMOS transistor Qs according to a discharging operation of the data line load LOD during driving at a positive voltage, the source S and the back gate end have a lower voltage than the drain D of the PMOS transistor Qs on the output terminal side. Therefore, when the PMOS transistor Qs is turned on, as indicated by thick line arrows in FIG. 1, a current flows from the data line load LOD toward the positive-polarity amplifier AMP.

However, in this case, as shown in FIG. 1, a parasitic bipolar transistor PaB formed between the P-type diffusion region Rd and the P-type diffusion region Rc responsible for the drain D of the PMOS transistor Qs is turned on. Thereby, as indicated by thick line arrows in FIG. 1, a current may flow from the data line load LOD via the P-type diffusion region Rd, the N-type well NW, the P-type semiconductor substrate PS, and the P-type diffusion region Rc.

That is, as shown in FIG. 1, a PNP-type parasitic bipolar transistor PaB in which the P-type diffusion region Rd of the PMOS transistor Qs on the data line load LOD side is an emitter, the P-type semiconductor substrate PS to which a negative power supply voltage VDDL is supplied is a collector, and the N-type well NW connected to the P-type diffusion region Rc responsible for back gate end of the PMOS transistor Qs is a base is formed.

Thereby, when the drive voltage output from the positive-polarity amplifier AMP has a voltage difference equal to or larger than the threshold voltage (absolute value) of the parasitic bipolar transistor PaB with respect to the voltage of the data line load LOD, for example, if the amount of change in the drive voltage is large and the rate of change is high, a parasitic bipolar current IR temporarily flows from the data line load LOD in addition to a current that flows through the PMOS transistor Qs. In particular, in the data driver, the parasitic bipolar current IR is generated simultaneously in a plurality of output circuits, which causes an adverse effect on surrounding circuit operations, and a failure of operations such as a discharging operation deviating from the circuit design, and in the worst case, there is a risk of latch-up being induced. Here, during driving at the negative voltage, the same problems as in the above PMOS transistor Qs occur in the NMOS transistor as an output selection switch.

Here, the disclosure provides an output circuit that can realize an operation with high reliability and reduce an area as an output circuit that selectively outputs positive and negative voltage signals, a display driver including the output circuit and a display device.

SUMMARY

An output circuit according to the disclosure includes a positive voltage signal supply circuit that supplies a positive voltage signal having a voltage higher than a reference power supply voltage to a first node or cuts off supply of the positive voltage signal to the first node; a negative voltage signal supply circuit that supplies a negative voltage signal having a voltage lower than the reference power supply voltage to a second node or cuts off supply of the negative voltage signal to the second node; a first output terminal; a first switch which is composed of a first PMOS transistor switch in which a source is connected to the first node and a drain is connected to the first output terminal, and connects the first output terminal and the first node when it is turned on and cuts off the connection between the first output terminal and the first node when it is turned off; a second switch which is composed of a first NMOS transistor switch in which a source is connected to the second node and a drain is connected to the first output terminal, and connects the first output terminal and the second node when it is turned on and cuts off the connection between the first output terminal and the second node when it is turned off; a third switch that applies the reference power supply voltage to the first node when it is turned on and stops application of the reference power supply voltage to the first node when it is turned off; a fourth switch that applies the reference power supply voltage to the second node when it is turned on and stops application of the reference power supply voltage to the second node when it is turned off; a first voltage control circuit that is connected to a gate of the first switch and controls the first switch such that it is brought into an on state; a second voltage control circuit that is connected to a gate of the second switch and controls the second switch such that it is brought into an on state; a first control device that is connected to a gate of the first switch and controls the first switch such that it is brought into an off state; a second control device that is connected to a gate of the second switch and controls the second switch such that it is brought into an off state; a third voltage control circuit that sets a voltage of the source or the drain of the first PMOS transistor switch as a first voltage and controls whether a second voltage obtained by shifting the level of the first voltage is supplied to a high potential side to a back gate of the first PMOS transistor switch or the reference power supply voltage is supplied to a back gate of the first PMOS transistor switch; and a fourth voltage control circuit that sets a voltage of the source or the drain of the first NMOS transistor switch as a third voltage and controls whether a fourth voltage obtained by shifting the level of the third voltage to a low potential side is supplied to a back gate of the first NMOS transistor switch or the reference power supply voltage is supplied to a back gate of the first NMOS transistor switch.

A display driver according to the disclosure includes the plurality of output circuits described above, wherein a plurality of gradation voltage signals having positive or negative voltage values for driving a plurality of data lines of a liquid crystal display panel are output from the plurality of output circuits.

A display device according to the disclosure includes the plurality of output circuits described above, and in which a plurality of gradation voltage signals having positive or negative voltage values are output from the plurality of output circuits; and a liquid crystal display panel having a plurality of data lines that receive the plurality of gradation voltage signals.

DETAILED DESCRIPTION

Example 1

Figure 2:
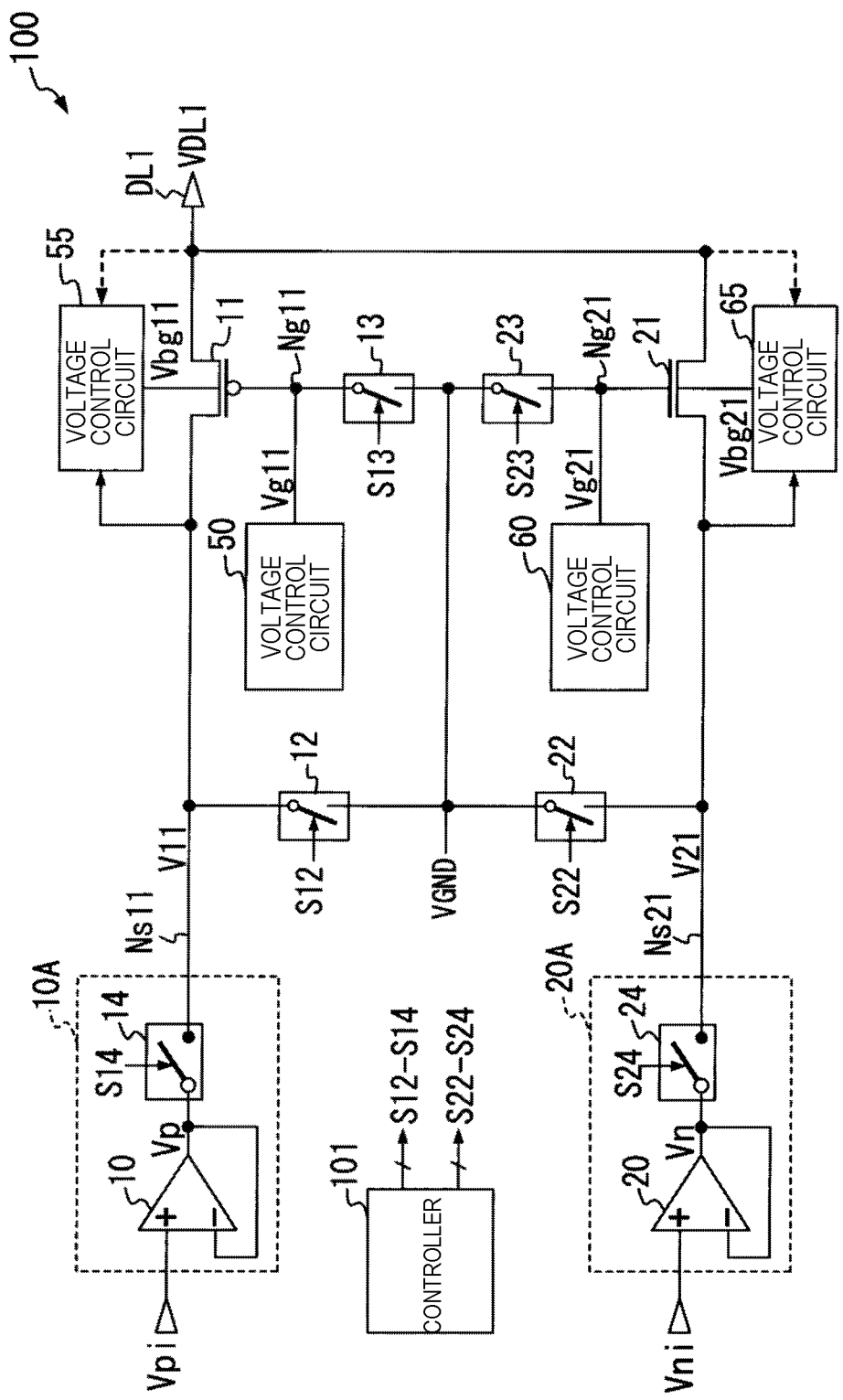
FIG. 2 is a circuit diagram showing an example of a configuration of an output circuit 100.

FIG. 2 is a circuit diagram showing a configuration of an output circuit 100 as an example of an output circuit according to the disclosure.

First, the type of a power supply voltage supplied to the output circuit 100 and the relationship between the power supply voltage and an element withstand voltage will be described.

The power supply supplied to the output circuit 100 includes at least three power supplies having a reference power supply voltage VGND, a positive power supply voltage VDDH, and a negative power supply voltage VDDL, which have the following magnitude relationship.

VDDL<VGND<VDDH

Here, a voltage higher than the reference power supply voltage VGND is described as a positive voltage, and a voltage lower than the reference power supply voltage VGND is described as a negative voltage.

On the other hand, while a withstand voltage VDDT is larger than a voltage difference a: (VDDH−VGND), and a voltage difference b: (|VDDL−VGND|), and less than a voltage difference c: (VDDH−VDDL), it is assumed to be as low a value as possible in order to reduce (cost reduction) a circuit area according to a low withstand voltage.

Here, the power supply voltage supplied to the output circuit 100 may include a positive-polarity side low power supply voltage VCCH and a negative-polarity side low power supply voltage VCCL represented by the following magnitude relationship in addition to the reference power supply voltage VGND, the positive power supply voltage VDDH, and the negative power supply voltage VDDL.

VDDL<VCCL<VGND<VCCH<VDDH

The output circuit 100 receives a signal having a potential higher than the reference power supply voltage VGND as a positive voltage signal Vpi and a signal having a potential equal to or lower than the reference power supply voltage VGND as a negative voltage signal Vni. Then, the output circuit 100 alternately selects one of a positive voltage signal Vp and a negative voltage signal Vn, which are obtained by individually amplifying the positive voltage signal Vpi and the negative voltage signal Vni, at predetermined timings, and outputs it to one capacitive load (for example, a data line of a liquid crystal display device).

Thereby, the output circuit 100 drives (polarity inversion drives) the capacitive load.

As shown in FIG. 2, the output circuit 100 includes an output terminal DL1 connected to one capacitive load, nodes Ns11 and Ns21, a positive voltage signal supply circuit 10A, a negative voltage signal supply circuit 20A, output selection switches 11 and 21, first to fourth voltage control circuits 50, 60, 55, and 65, switches 12 and 22, first and second control devices 13 and 23, and a controller 101.

The positive voltage signal supply circuit 10A controls supply and cut off of any positive voltage signal Vp (VGND<Vp<VDDH) having a voltage value on the side with a higher potential than that of the reference power supply voltage VGND to and from the node Ns11. The negative voltage signal supply circuit 20A controls supply and cut off of any negative voltage signal Vn (VGND>Vn>VDDL) having a voltage value on the side with a lower potential than that of the reference power supply voltage VGND to and from the node Ns21.

The output selection switch 11 is composed of a PMOS-type transistor switch that connects the node Ns11 to the output terminal DL1 when it is turned on and outputs a voltage V11 of the node Ns11 to the output terminal DL1. Hereinafter, the output selection switch 11 will also be referred to as the PMOS transistor switch 11. In the PMOS transistor switch 11, a first terminal (hereinafter referred to as a source) is connected to the node Ns11, a second terminal (hereinafter referred to as a drain) is connected to the output terminal DL1, and a control end (hereinafter referred to as a gate) is commonly connected to the first voltage control circuit 50 and the first control device 13.

The output selection switch 21 is composed of an NMOS transistor switch that connects the node Ns21 to the output terminal DL1 when it is turned on and outputs a voltage V21 of the node Ns21 to the output terminal DL1. Hereinafter the output selection switch 21 will also be referred to as the NMOS transistor switch 21. In the NMOS transistor switch 21, the source is connected to the node Ns21, the drain is connected to the output terminal DL1, and the gate is commonly connected to the second voltage control circuit 60 and the second control device 23.

The switch 12 is composed of, for example, an NMOS-type transistor switch connected between the node Ns11 and a reference power supply terminal that receives the reference power supply voltage VGND. The switch 12 applies the reference power supply voltage VGND to the node Ns11 when it is turned on, and stops application of the reference power supply voltage VGND to the node Ns11 when it is turned off.

The switch 22 is composed of, for example, a PMOS-type transistor switch connected between the node Ns21 and the reference power supply terminal. The switch 22 applies the reference power supply voltage VGND to the node Ns21 when it is turned on and stops application of the reference power supply voltage VGND to the node Ns21 when it is turned off.

The first control device 13 is composed of, for example, a PMOS transistor switch 13 (hereinafter simply referred to as a switch 13) connected between the gate of the PMOS transistor switch 11 and the reference power supply terminal. The first control device 13 is controlled in connection with control of the on state of the switch 12, and when it is turned on together with the switch 12, it supplies the reference power supply voltage VGND to the gate of the PMOS transistor switch 11, and controls the PMOS transistor switch 11 such that it is brought into an off state. Here, the switch 13 can also be provided between the gate of the PMOS transistor switch 11 and the node Ns11.

The second control device 23 is composed of, for example, an NMOS transistor switch 23 (hereinafter simply referred to as a switch 23) connected between the gate of the NMOS transistor switch 21 and the reference power supply terminal. The second control device 23 is controlled in connection with control of the on state of the switch 22, and when it is turned on together with the switch 22, it supplies the reference power supply voltage VGND to the gate of the NMOS transistor switch 21, and controls the NMOS transistor switch 21 such that it is brought into an off state. Here, the switch 23 can also be provided between the gate of the NMOS transistor switch 21 and the node Ns21.

Here, in an example shown in FIG. 2, the first and second control devices 13 and 23 are shown in the form of switches. Here, the pair of switches 12 and 13 and the pair of switches 22 and 23 are controlled such that one is turned on and the other is turned off when a positive or negative voltage signal (Vp or Vn) is output to the output terminal DL1.

The first voltage control circuit 50 is connected to the gate of the PMOS transistor switch 11, and is in an active state when the first control device 13 is in an inactive state (the switch 13 is turned off). The first voltage control circuit 50 in the active state generates a voltage for the PMOS transistor switch 11 to maintain an on state as a gate voltage Vg11 and supplies it to the gate of the PMOS transistor switch 11. Here, when the first control device 13 is in an active state (the switch 13 is turned on), the first voltage control circuit 50 is in an inactive state.

The second voltage control circuit 60 is connected to the gate of the NMOS transistor switch 21 and in an active state when the second control device 23 is in an inactive state (the switch 23 is turned off). The second voltage control circuit 60 in the active state generates a voltage for the NMOS transistor switch 21 to maintain an on state as a gate voltage Vg21 and supplies it to the gate of the NMOS transistor switch 21. Here, when the second control device 23 is in an active state (the switch 23 is turned on), the second voltage control circuit 60 is in an inactive state.

The third voltage control circuit 55 operates in conjunction with the first voltage control circuit 50 and supplies a voltage Vbg11 that controls a back gate of the PMOS transistor switch 11. Specifically, when the first voltage control circuit 50 is in an inactive state and the PMOS transistor switch 11 is controlled such that it is brought into an off state, the third voltage control circuit 55 supplies the reference power supply voltage VGND as the back gate voltage Vbg11 to the back gate of the PMOS transistor switch 11.

On the other hand, when the first voltage control circuit 50 is in an active state and the PMOS transistor switch 11 is controlled such that it is brought into an on state, the third voltage control circuit 55 sets the voltage (V11) of the source (Ns11) of the PMOS transistor switch 11 or the voltage (VDL1) of the drain (the output terminal DL1) as a first reference voltage, and supplies a voltage of which the level is shifted to the high potential side as the back gate voltage Vbg11 to the back gate of the PMOS transistor switch 11.

The fourth voltage control circuit 65 operates in conjunction with the second voltage control circuit 60 and supplies a voltage Vbg21 that controls a back gate of the NMOS transistor switch 21. Specifically, when the second voltage control circuit 60 is in an inactive state and the NMOS transistor switch 21 is controlled such that it is brought into an off state, the fourth voltage control circuit 65 supplies the reference power supply voltage VGND as the back gate voltage Vbg21 to the back gate of the NMOS transistor switch 21.

On the other hand, when the second voltage control circuit 60 is in an active state and the NMOS transistor switch 21 is controlled such that it is brought into an on state, the fourth voltage control circuit 65 sets the voltage (V21) of the source (Ns21) of the NMOS transistor switch 21 or the voltage (VDL1) of the drain (the output terminal DL1) as a second reference voltage and supplies a voltage of which the level is shifted to the low potential side as the back gate voltage Vbg21 to the back gate of the NMOS transistor switch 21.

Figure 1:
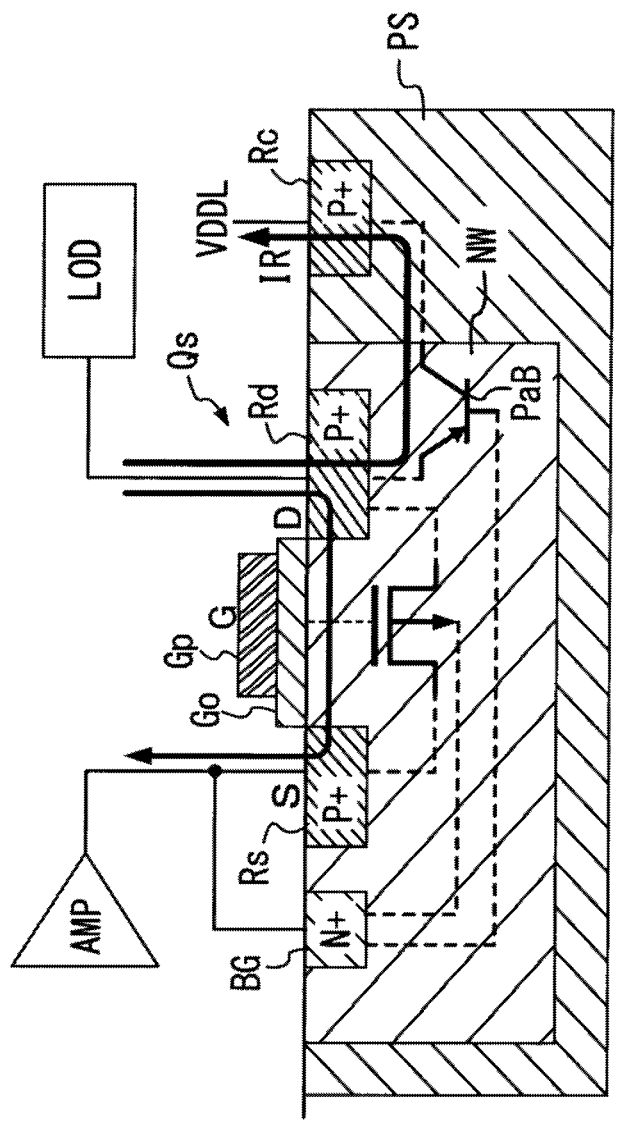
FIG. 1 is a cross-sectional view of a PMOS transistor and a semiconductor substrate indicating a parasitic bipolar transistor parasitic to the PMOS transistor.

Here, the operation of the third voltage control circuit 55 described above when the PMOS transistor switch 11 is turned on is that, when the PMOS transistor switch 11 allows the positive voltage signal Vp to pass therethrough, the back gate voltage Vbg11 of the PMOS transistor switch 11 is controlled to be a voltage higher than the positive voltage signal Vp supplied to the source and the drain of the PMOS transistor switch 11. Thereby, the threshold voltage (absolute value) of the PMOS transistor switch 11 increases due to a back gate effect, and when the voltage changes according to a discharging operation or a charging operation of the capacitive load due to the positive voltage signal Vp, the generation of PNP parasitic bipolar transistors (for example, PaB in FIG. 1) is restricted.

However, in this case, if the voltage difference between the back gate voltage Vbg11 and the voltage (Vp) of the source or the drain of the PMOS transistor switch 11 is too large, the threshold voltage (absolute value) of the PMOS transistor switch 11 increases significantly, and accordingly, the on-resistance of the PMOS transistor switch 11 increases. Therefore, in the voltage control circuit 55, the level shift amount thereof is controlled such that the increase in the on-resistance of the PMOS transistor switch 11 is minimized and the voltage difference is small enough to restrict the generation of PNP parasitic bipolar transistors described above.

Similarly, the operation of the fourth voltage control circuit 65 when the NMOS transistor switch 21 is turned on is that, when the NMOS transistor switch 21 allows the negative voltage signal Vn to pass therethrough, the back gate voltage Vbg21 of the NMOS transistor switch 21 is controlled to be a voltage lower than the negative voltage signal Vn supplied to the source and the drain of the NMOS transistor switch 21. Thereby, the threshold voltage of the NMOS transistor switch 21 increases due to the back gate effect, and when the voltage changes according to a charging operation or a discharging operation of the capacitive load due to the negative voltage signal Vn, the generation of NPN parasitic bipolar transistors is restricted.

However, in this case, if the voltage difference between the back gate voltage Vbg21 and the voltage (Vn) of the source or the drain of the NMOS transistor switch 21 is too large, the threshold voltage of the NMOS transistor switch 21 increases significantly, and accordingly, the on-resistance of the NMOS transistor switch 21 increases. Therefore, in the voltage control circuit 65, the level shift amount thereof is controlled so that the on-resistance increase of the NMOS transistor switch 21 is minimized and the voltage difference is small enough to restrict the generation of NPN parasitic bipolar transistors.

The positive voltage signal supply circuit 10A is composed of an amplifier circuit 10 that outputs a positive voltage signal Vp and a switch 14 that controls supply and cut off of the positive voltage signal Vp to and from the node Ns11.

The switch 14 is composed of a CMOS switch including a PMOS transistor and an NMOS transistor in order for the positive voltage signal Vp in a wide voltage range to pass through. Both ends of the switch 14 are terminals in the same positive voltage range, and a CMOS switch may be simply used. Here, the amplifier circuit 10 may include functions of the switch 14 internally, and in this case, the output node of the amplifier circuit 10 is the node Ns11. In addition, in FIG. 2, the amplifier circuit 10 is not limited to a voltage follower that amplifies and outputs the same positive voltage signal Vp as the input voltage signal Vpi, and may be an amplifier circuit in which the input voltage signal Vpi and the output voltage signal Vp are different from each other. Hereinafter, the voltage signal supplied from the positive voltage signal supply circuit 10A to the node Ns11 will be referred to as Vp.

The negative voltage signal supply circuit 20A is composed of an amplifier circuit 20 that outputs a negative voltage signal Vn and a switch 24 that controls supply and cut off of the negative voltage signal Vn to and from the node Ns21. The switch 24 is composed of a CMOS switch in order for the negative voltage signal in a wide voltage range to pass through. Here, the amplifier circuit 20 may include functions of the switch 24 internally, and in this case, the output node of the amplifier circuit 20 is the node Ns21.

In addition, in FIG. 2, the amplifier circuit 20 is not limited to a voltage follower that amplifies and outputs the same negative voltage signal Vn as the input voltage signal Vni, and may be an amplifier circuit in which the input voltage signal Vni and the output voltage signal Vn are different from each other. Hereinafter, the voltage signal supplied from the negative voltage signal supply circuit 20A to the node Ns21 will be referred to as Vn.

The switches 12 to 14 and 22 to 24 are controlled such that they are individually turned on and off with control signals S12 to S14, and S22 to S24 output from the controller 101, respectively. In addition, when the first to fourth voltage control circuits 50, 60, 55, and 65 are controlled by a control signal, the control signal is supplied from the controller 101.

Next, an element withstand voltage of the output circuit 100 shown in FIG. 2 will be described. Each element of the output circuit 100 has a withstand voltage VDDT lower than an output voltage range, and the minimum withstand voltage is about ½ of the output voltage range.

Specifically, since the voltage from the positive voltage signal supply circuit 10A to the node Ns11 is kept within a range from the reference power supply voltage VGND to the positive power supply voltage VDDH, the amplifier circuit 10 and the switch 14 can be composed of transistors of the withstand voltage VDDT lower than the output voltage range. Similarly, since the voltage from the negative voltage signal supply circuit 20A to the node Ns21 is kept within a range from the reference power supply voltage VGND to the negative power supply voltage VDDL, the amplifier circuit 20 and the switch 24 can be composed of transistors of the withstand voltage VDDT lower than the output voltage range.

Next, the element withstand voltage of the PMOS transistor switch 11 as an output selection switch will be described.

For example, when the positive voltage signal Vp is output to the output terminal DL1, control is performed such that the switches 12 and 13 are both turned off, and the PMOS transistor switch 11 is turned on by the first voltage control circuit 50. In this case, the voltages of the source and the drain of the PMOS transistor switch 11 are within the positive voltage range of VGND to VDDH. Thereby, the voltage difference between the gate and the source of the PMOS transistor switch 11 is controlled such that it is within the withstand voltage VDDT lower than the output voltage range. In addition, according to the first voltage control circuit 50 and the third voltage control circuit 55, the voltage difference between the gate and the back gate of the PMOS transistor switch 11 is also controlled such that it is within the withstand voltage VDDT.

On the other hand, when the negative voltage signal Vn is output to the output terminal DL1, the reference power supply voltage VGND is supplied to the gate and the source by the switches 12 and 13, and the PMOS transistor switch 11 is controlled such that it is brought into an off state. Therefore, even when the negative voltage signal Vn is output to the output terminal DL1 to which the drain of the PMOS transistor switch 11 is connected, the voltage between the source, drain, gate, and back gate terminals of the PMOS transistor switch 11 is controlled such that it is within the withstand voltage VDDT lower than the output voltage range.

Here, when the output terminal DL1 switches the positive voltage signal Vp to the negative voltage signal Vn, for example, control is performed such that the switch 13 is turned off while the switch 12 is turned on, and when the first voltage control circuit 50 is operated, the output terminal DL1 is temporarily driven from the positive voltage to the reference power supply voltage VGND. Then, the operation is switched to the output operation of the negative voltage signal Vn. Thereby, the voltage difference between the terminals of the PMOS transistor switch 11 can be kept within the low withstand voltage VDDT.

Next, the element withstand voltage of the NMOS transistor switch 21 as an output selection switch will be described.

For example, when the negative voltage signal Vn is output to the output terminal DL1, control is performed such that the switches 22 and 23 are both turned off, and the NMOS transistor switch 21 is turned on by the second voltage control circuit 60. In this case, the voltages of the source and the drain of the NMOS transistor switch 21 are within the negative voltage range of VGND to VDDL. The voltage difference between the gate and the source of the NMOS transistor switch 21 is controlled such that it is within the withstand voltage VDDT. In addition, according to the second voltage control circuit 60 and the fourth voltage control circuit 65, the voltage difference between the gate and the back gate of the NMOS transistor switch 21 is also controlled such that it is within the withstand voltage VDDT.

On the other hand, when the positive voltage signal Vp is output to the output terminal DL1, the reference power supply voltage VGND is supplied to the gate and the source by the switches 22 and 23, and the NMOS transistor switch 21 is controlled such that it is brought into an off state. Therefore, even when the output terminal DL1 to which the drain is connected is the positive voltage signal Vp, the voltage between the source, drain, gate, and back gate terminals of the NMOS transistor switch 21 is controlled such that it is within the withstand voltage VDDT. Here, when the output terminal DL1 switches the negative voltage signal Vn to the positive voltage signal Vp, for example, control is performed such that the switch 23 is turned off while the switch 22 is turned on, and when the second voltage control circuit 60 is operated, the output terminal DL1 is temporarily driven from the negative voltage to the reference power supply voltage VGND. Then, the operation is switched to the output operation of the positive voltage signal Vp. Thereby, the voltage difference between the terminals of the NMOS transistor switch 21 can be kept within the withstand voltage VDDT lower than the output voltage range.

As described above, the output circuit 100 shown in FIG. 2 includes the output selection switches 11 and 21 and can be composed of transistors of the withstand voltage VDDT lower than the output voltage range.

Next, operations of the third and fourth voltage control circuits 55 and 65 will be described with reference to FIG. 3A and FIG. 3B.

Figure 3A:
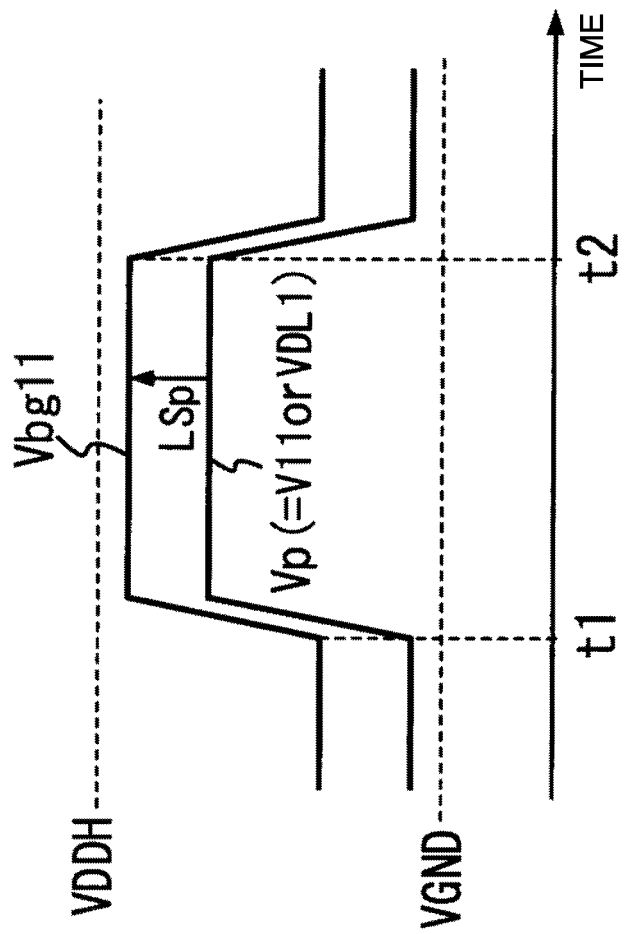
FIG. 3A is a waveform diagram showing a waveform of a back gate voltage Vbg11 generated from a voltage control circuit 55 following a positive voltage signal Vp.

FIG. 3A shows signal waveforms of, when the positive voltage signal Vp is continuously output, the positive voltage signal Vp supplied to the source side or the drain side of the PMOS transistor switch 11, and the back gate voltage Vbg11 of the PMOS transistor switch 11 controlled by the third voltage control circuit 55. Here, the positive voltage signal Vp supplied to the source side of the PMOS transistor switch 11 is the voltage signal V11 on the node Ns11, and the positive voltage signal Vp supplied to the drain side of the PMOS transistor switch 11 is the output signal VDL1 on the output terminal DL1.

In an example shown in FIG. 3A, the voltage signal Vp (V11 or VDL1) supplied to the source side or the drain side of the PMOS transistor switch 11 changes from a positive voltage near the reference power supply voltage VGND to a positive voltage near the positive power supply voltage VDDH at a time t1, and then changes to a positive voltage near the reference power supply voltage VGND again at a time t2. In this case, as shown in FIG. 3A, the back gate voltage Vbg11 of the PMOS transistor switch 11 maintains a voltage of which the level is shifted by a predetermined voltage difference LSp to the positive side with respect to the voltage signal Vp and operates in the following manner. The predetermined voltage difference LSp is controlled such that the increase in the on-resistance of the PMOS transistor switch 11 is minimized and the voltage difference is relatively small enough to restrict the generation of PNP parasitic bipolar transistors (for example, PaB in FIG. 1).

Here, in FIG. 3A, when the positive voltage signal Vp (V11 or VDL1) is near the positive power supply voltage VDDH, the back gate voltage Vbg11 is equal to or less than the positive power supply voltage VDDH, and the voltage difference from the voltage signal Vp is reduced.

Figure 3B:
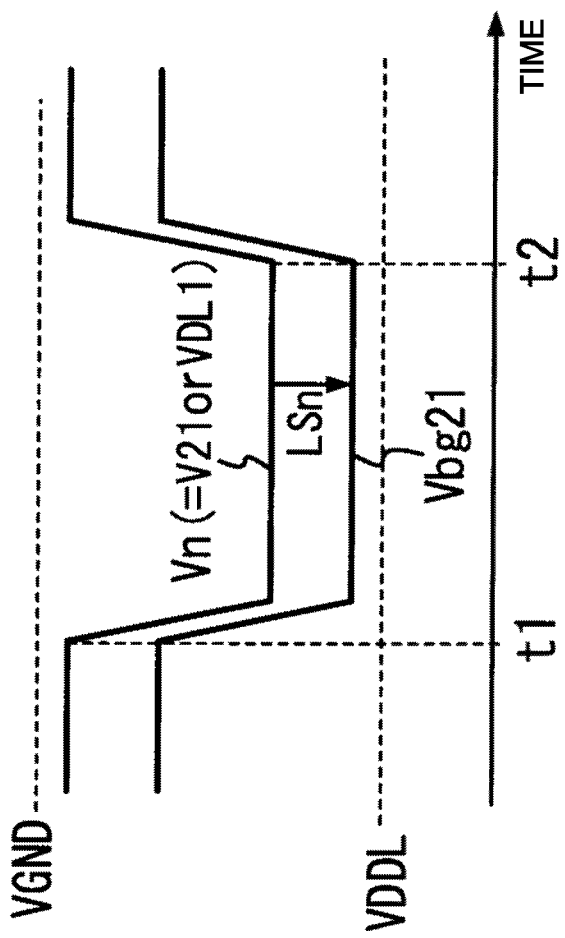
FIG. 3B is a waveform diagram showing a waveform of a back gate voltage Vbg21 generated from a voltage control circuit 65 following a negative voltage signal Vn.

FIG. 3B shows signal waveforms of, when the negative voltage signal Vn is continuously output, the negative voltage signal Vn supplied to the source side or the drain side of the NMOS transistor switch 21 and the back gate voltage Vbg21 of the NMOS transistor switch 21 controlled by the fourth voltage control circuit 65. Here, the negative voltage signal Vn supplied to the source side of the NMOS transistor switch 21 is the voltage signal V21 on the node Ns21, and the negative voltage signal Vn supplied to the drain side of the NMOS transistor switch 21 is the output signal VDL1 on the output terminal DL1.

In an example shown in FIG. 3B, the voltage signal Vn (V21 or VDL1) supplied to the source side or the drain side of the NMOS transistor switch 21 changes a negative voltage near the reference power supply voltage VGND to a negative voltage near the negative power supply voltage VDDL at a time t1, and then changes to a negative voltage near the reference power supply voltage VGND again at a time t2. In this case, the back gate voltage Vbg21 of the NMOS transistor switch 21 maintains a predetermined voltage difference LSn of which the level is shifted to the negative side with respect to the voltage signal Vn and operates in the following manner. The predetermined voltage difference LSn is controlled such that the increase in the on-resistance of the NMOS transistor switch 21 is minimized and the voltage difference is relatively small enough to restrict the generation of NPN parasitic bipolar transistors. In FIG. 3B, when the negative voltage signal Vn (V21 or VDL1) is near the negative power supply voltage VDDL, the back gate voltage Vbg21 is equal to or higher than the negative power supply voltage VDDL and the voltage difference from the voltage signal Vn is reduced.

As described above, when the back gate voltage of the PMOS transistor switch 11 is controlled by the third voltage control circuit 55, it is possible to restrict the generation of parasitic bipolar transistors of the PMOS transistor switch 11. Similarly, when the back gate voltage of the NMOS transistor switch 21 is controlled by the fourth voltage control circuit 65, it is possible to restrict the generation of parasitic bipolar transistors of the NMOS transistor switch 21.

In addition, since the entire output circuit 100 shown in FIG. 2 can also be composed of elements in the withstand voltage VDDT lower than the output voltage range (VDDL to VDDH), it is possible to reduce the area (reduce costs).

Therefore, according to the disclosure, for an output circuit that selectively outputs positive and negative voltage signals, it is possible to improve the reliability of the operation and reduce the area.

Next, a control example of the output circuit 100 shown in FIG. 2 will be described with reference to FIG. 4.

Figure 4:
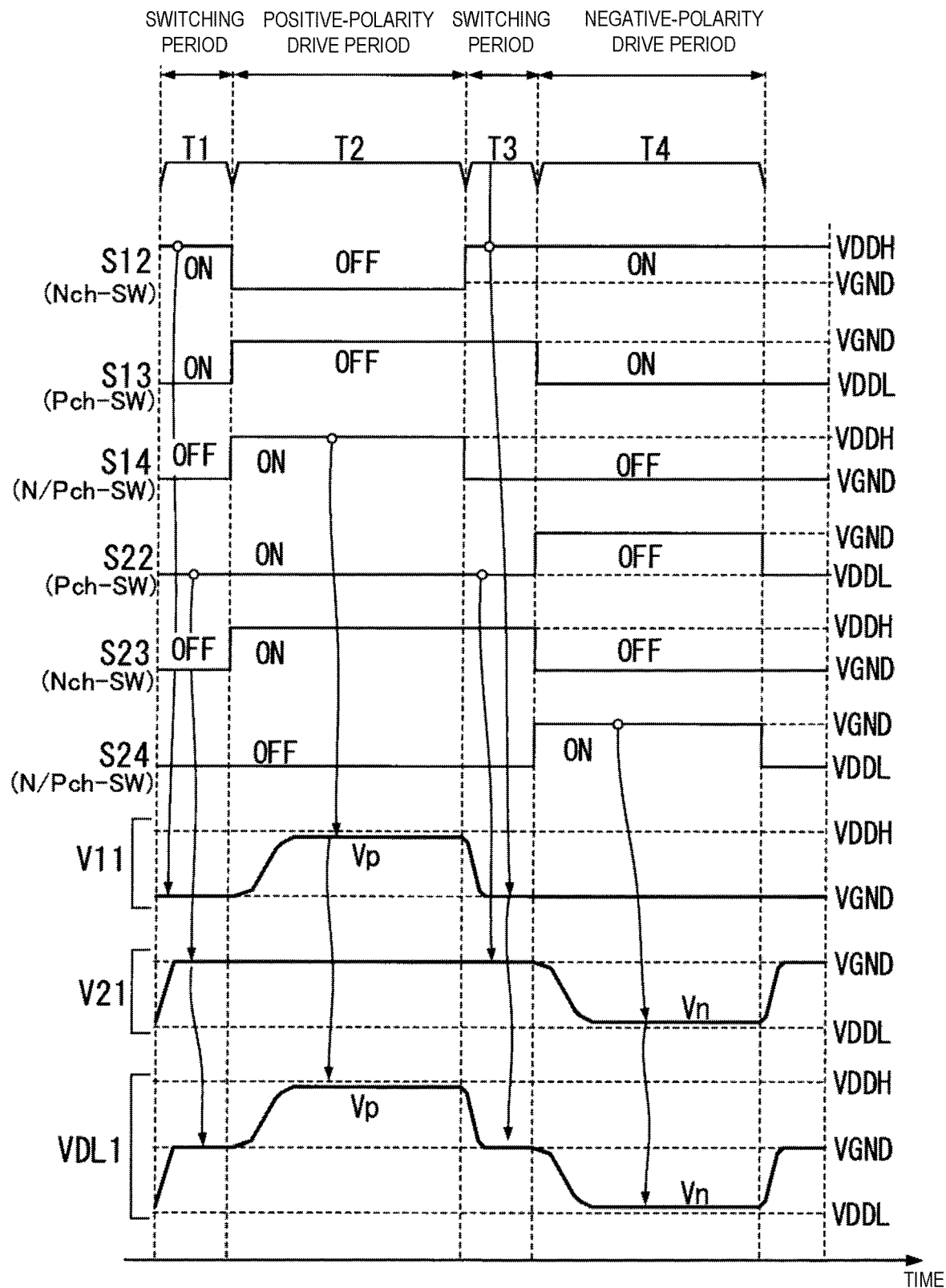
FIG. 4 is a time chart showing an example of control signals S12 to S14, and S22 to S24 generated from a controller 101.

FIG. 4 is a time chart showing an example of control states of control signals S12 to S14, and S22 to S24 generated from the controller 101 shown in FIG. 2.

Here, FIG. 4 shows an example of control signals generated by the controller 101 when so-called polarity inversion driving in which the output circuit 100 periodically alternately switches and outputs a positive voltage signal Vp and a negative voltage signal Vn is performed. In addition, FIG. 4 shows on/off control for the switches shown in FIG. 2, and voltage waveforms of the positive voltage signal V11 on the node Ns11, the negative voltage signal V21 on the node Ns21, and the output voltage VDL1 on the output terminal DL1 in each of a positive-polarity drive period in which the positive voltage signal Vp is output and a negative-polarity drive period in which the negative voltage signal Vn is output. In this case, the positive voltage signal Vp and the negative voltage signal Vn may be a single step signal or a plurality of step signals within the voltage range corresponding to each polarity.

In addition, in an example shown in FIG. 4, switching periods T1 and T3 are provided between the positive-polarity drive period T2 and the negative-polarity drive period T4, respectively, and in the switching period, in order to prevent the withstand voltage of the elements from being exceeded, the output terminal DL1 is temporarily driven to the reference power supply voltage VGND. Here, the positive-polarity drive period T2 and the negative-polarity drive period T4 may be divided into a plurality of periods in which a plurality of voltage signals having the same polarity are sequentially output.

Here, in order to perform the drive shown in FIG. 4, for example, the switches 12 and 23 are NMOS transistor switches, the switches 13 and 22 are PMOS transistor switches, and the switches 14 and 24 are CMOS transistor switches. It is assumed that control signals S12 to S14, and S22 to S24 that control the switches are supplied with a power supply voltage corresponding to the voltage polarity of the switch controlled by each signal.

In addition, FIG. 4 shows the on/off control states of the CMOS transistor switches 14 and 24 according to the voltage supplied to one NMOS transistor switch in the CMOS switch configuration.

In addition, in FIG. 4, the state immediately before (initial state) the switching period T1 is assumed to be a state in which the negative voltage signal Vn generated by the negative voltage signal supply circuit 20A is supplied to the output terminal DL1 via the NMOS transistor switch 21, that is, the operation state in the negative-polarity drive period T4.

In FIG. 4, first, in the switching period T1, the switches 14 and 24 are both turned off by control signals S14 and S24, and supply of voltage signals from the positive voltage signal supply circuit 10A and the negative voltage signal supply circuit 20A is cut off. In addition, the switches 12 and 13 are both turned on by control signals S12 and S13, and the reference power supply voltage VGND is supplied to the gate and the source (the node Ns11) of the PMOS transistor switch 11. Thereby, the voltage control circuit 50 is in an inactive state, the PMOS transistor switch 11 is in an off state, and the voltage V11 of the node Ns11 is the reference power supply voltage VGND. In this case, the reference power supply voltage VGND is supplied from the voltage control circuit 55 to the back gate of the PMOS transistor switch 11. In addition, according to the control signal S22, the switch 22 is turned on, and the reference power supply voltage VGND is supplied to the source (the node Ns21) of the NMOS transistor switch 21. In addition, according to the control signal S23, the switch 23 is turned off, the voltage control circuit 60 is in an active state, and the NMOS transistor switch 21 is turned on. In this case, a voltage of which the level is shifted to the negative side with respect to the voltage (VGND) of the source or the drain of the NMOS transistor switch 21 by the voltage difference LSn is supplied to the back gate of the NMOS transistor switch 21 from the voltage control circuit 65.

Therefore, as shown in FIG. 4, in the switching period T1, the voltage V21 of the node Ns21 is raised to the reference power supply voltage VGND, and the output voltage VDL1 of the output terminal DL1 is also raised to the reference power supply voltage VGND via the NMOS transistor switch 21.

Next, in the positive-polarity drive period T2, according to the control signal S24, the switch 24 is turned off, and supply of the voltage signal from the negative voltage signal supply circuit 20A is continuously cut off. On the other hand, according to the control signal S14, the switch 14 is turned on, and the positive voltage signal Vp is supplied from the positive voltage signal supply circuit 10A to the node Ns11. In addition, according to the control signals S22 and S23, the switches 22 and 23 are both turned on, and the reference power supply voltage VGND is supplied to the gate and the source (the node Ns21) of the NMOS transistor switch 21. Thereby, the voltage control circuit 60 is in an inactive state, the NMOS transistor switch 21 is in an off state, and the voltage V21 of the node Ns21 continues to be the reference power supply voltage VGND. In this case, the reference power supply voltage VGND is supplied to the back gate of the NMOS transistor switch 21 from the voltage control circuit 65. In addition, according to the control signals S12 and S13, the switches 12 and 13 are both turned off, the voltage control circuit 50 is activated, and the PMOS transistor switch 11 is turned on. Then, as shown in FIG. 4, the output voltage VDL1 of the output terminal DL1 is raised to the positive voltage signal Vp via the PMOS transistor switch 11 in the on state. In this case, a voltage of which the level is shifted to the positive side with respect to the voltage (Vp) of the source or the drain of the PMOS transistor switch 11 by the voltage difference LSp is supplied to the back gate of the PMOS transistor switch 11 from the voltage control circuit 55. Here, in the positive-polarity drive period T2, even if the positive voltage signal Vp output from the positive voltage signal supply circuit 10A changes, since the voltage control circuit 50 maintains the on state of the PMOS transistor switch 11, the output voltage VDL1 also changes following the positive voltage signal Vp. In addition, even if the positive voltage signal Vp largely changes to the negative side, since the voltage control circuit 55 supplies a voltage that is higher than the positive voltage signal Vp by the voltage difference LSp to the back gate of the PMOS transistor switch 11, the generation of parasitic bipolar transistors is prevented.

Next, in the switching period T3, according to the control signals S14 and S24, the switches 14 and 24 are both turned off, and the supply of voltage signals from the positive voltage signal supply circuit 10A and the negative voltage signal supply circuit 20A is cut off. In addition, according to the control signals S22 and S23, the switches 22 and 23 are both continuously turned on, and the reference power supply voltage VGND is supplied to the gate and the source (the node Ns21) of the NMOS transistor switch 21. Thereby, the voltage control circuit 60 is kept inactive, the NMOS transistor switch 21 is kept off, and as shown in FIG. 4, the voltage V21 of the node Ns21 is also maintained at the reference power supply voltage VGND. In this case, the reference power supply voltage VGND is supplied to the back gate of the NMOS transistor switch 21 from the voltage control circuit 65. In addition, according to the control signal S12, the switch 12 is turned on, and the reference power supply voltage VGND is supplied to the source (the node Ns11) of the PMOS transistor switch 11. In addition, according to the control signal S13, the switch 13 is continuously turned off, the voltage control circuit 50 is maintained in the active state, and the PMOS transistor switch 11 is maintained in the on state. In this case, a voltage of which the level is shifted to the positive side with respect to the voltage (VGND) of the source or the drain of the PMOS transistor switch 11 by the voltage difference LSp is continuously supplied to the back gate of the PMOS transistor switch 11 from the voltage control circuit 55. Therefore, in the switching period T3, the voltage V11 of the node Ns11 is lowered to the reference power supply voltage VGND, and the output voltage VDL1 of the output terminal DL1 is also lowered to the reference power supply voltage VGND via the PMOS transistor switch 11.

Next, in the negative-polarity drive period T4, according to the control signal S14, the switch 14 is turned off, and supply of the voltage signal from the positive voltage signal supply circuit 10A is continuously cut off. On the other hand, according to the control signal S24, the switch 24 is turned on, and the negative voltage signal Vn is supplied from the negative voltage signal supply circuit 20A to the node Ns21. In addition, according to the control signals S12 and S13, the switches 12 and 13 are both turned on, and the reference power supply voltage VGND is supplied to the gate and the source (the node Ns11) of the PMOS transistor switch 11. Thereby, the voltage control circuit 50 is in an inactive state, the PMOS transistor switch 11 is in an off state, and the voltage V11 of the node Ns11 is maintained at the reference power supply voltage VGND. In this case, the reference power supply voltage VGND is supplied to the back gate of the PMOS transistor switch 11 from the voltage control circuit 55. In addition, according to the control signals S22 and S23, the switches 22 and 23 are both turned off, the voltage control circuit 60 is activated, and the NMOS transistor switch 21 is turned on. Then, as shown in FIG. 4, the output voltage VDL1 of the output terminal DL1 is lowered to the negative voltage signal Vn via the NMOS transistor switch 21 in the on state. In this case, a voltage of which the level is shifted to the negative side with respect to the voltage (Vn) of the source or the drain of the NMOS transistor switch 21 by the voltage difference LSn is supplied from the voltage control circuit 65 to the back gate of the NMOS transistor switch 21. Here, in the negative-polarity drive period T4, even if the voltage value of the negative voltage signal Vn output from the negative voltage signal supply circuit 20A changes, since the on state of the NMOS transistor switch 21 is maintained by the voltage control circuit 60, and output voltage VDL1 also changes according to the voltage value of the negative voltage signal Vn. In addition, even if the negative voltage signal Vn largely changes to the positive side, since the voltage control circuit 65 supplies a voltage that is lower than the negative voltage signal Vn by the voltage difference LSn to the back gate of the NMOS transistor switch 21, the generation of parasitic bipolar transistors is prevented.

Here, in an example shown in FIG. 4, a drive control example in which a positive-polarity drive period and a negative-polarity drive period are alternately switched has been described, but when power supply is turned on or power supply is turned off, control is performed according to the rise and fall of the power supply voltage. For example, when the power supply voltage rises or falls, since the capacitive load connected to the output terminal DL1 is driven to the reference power supply voltage VGND, for example, control is performed such that supply of voltage signals of the positive voltage signal supply circuit 10A and the negative voltage signal supply circuit 20A is cut off (the switches 14 and 24 are turned off), the switches 12 and 22 are both turned on, and the switches 13 and 23 are both turned off. In this case, it may be controlled such that the voltage control circuits 50 and 60 are both in an active state, and the transistor switches 11 and 21 are both turned on. In addition, in conjunction with the active state of the voltage control circuit 50, the voltage control circuit 55 may control such that a voltage of which the level is shifted to the positive side with respect to the reference power supply voltage VGND is supplied to the back gate of the PMOS transistor switch 11. Similarly, in conjunction with the active state of the voltage control circuit 60, the voltage control circuit 65 may control such that a voltage of which the level is shifted to the negative side with respect to the reference power supply voltage VGND is supplied to the back gate of the NMOS transistor switch 21.

Hereinafter, an example of the third voltage control circuit 55 included in the output circuit 100 shown in FIG. 2 will be described.

Figure 5:
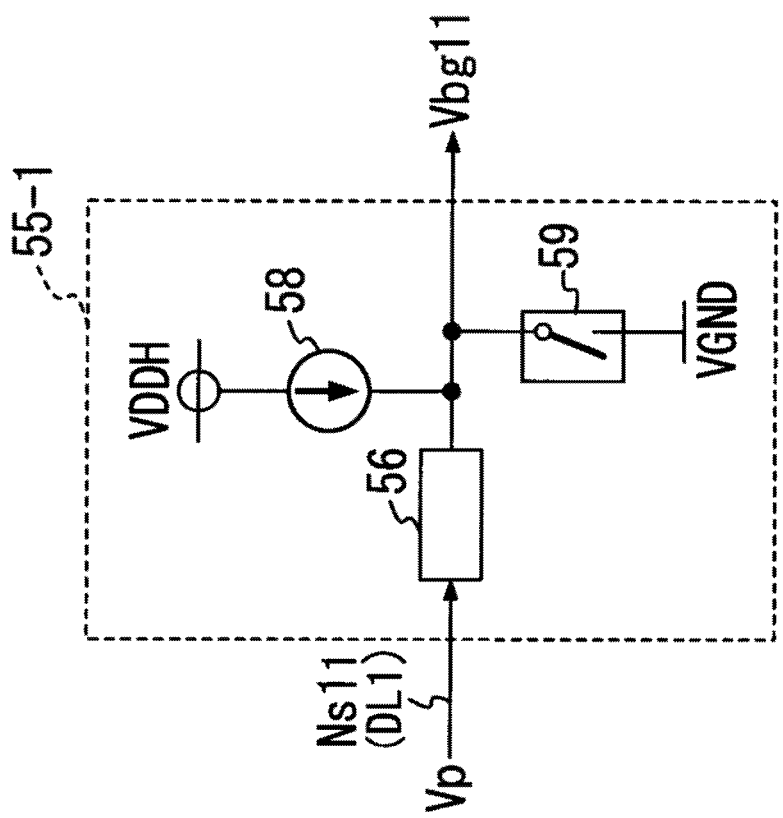
FIG. 5 is a circuit diagram showing a voltage control circuit 55-1 as a first example of the voltage control circuit 55.

FIG. 5 is a circuit diagram showing a configuration of a voltage control circuit 55-1 as a first example of the voltage control circuit 55.

The voltage control circuit 55-1 shown in FIG. 5 controls a voltage supplied to the back gate of the PMOS transistor switch 11. When the PMOS transistor switch 11 is turned on, the voltage control circuit 55-1 supplies a voltage of which the level is shifted to the high voltage side by the predetermined voltage difference LSp with respect to the voltage (the positive voltage signal Vp or the reference power supply voltage VGND) supplied to the source (Ns11) or the drain (DL1) of the PMOS transistor switch 11 as the back gate voltage Vbg11 to the back gate of the PMOS transistor switch 11. In addition, when the PMOS transistor switch 11 is turned off, the voltage control circuit 55-1 supplies the reference power supply voltage VGND to the back gate of the PMOS transistor switch 11. Here, FIG. 5 shows an example in which the positive voltage signal Vp is supplied as the voltage supplied to the source (Ns11) or the drain (DL1) of the PMOS transistor switch 11. The same applies to examples of the voltage control circuit 55 shown in FIG. 5 and below.

The voltage control circuit 55-1 shown in FIG. 5 includes a load element 56 of which one end is connected to the back gate of the PMOS transistor switch 11 and a current source 58 that sets a value of a current that flows through the load element 56.

The load element 56 receives a voltage (for example, the positive voltage signal Vp) supplied to the source (Ns11) or the drain (DL1) of the PMOS transistor switch 11 at one end thereof when the PMOS transistor switch 11 is turned on, and supplies the voltage Vbg11 having a predetermined voltage difference LSp to the positive side with respect to the positive voltage signal Vp to the back gate of the PMOS transistor switch 11 via the other end thereof. The voltage Vbg11 is controlled such that it is a voltage higher than the positive voltage signal Vp and equal to or lower than the positive power supply voltage VDDH. A voltage difference LSp between the positive voltage signal Vp and the back gate of the PMOS transistor switch 11 is set by a voltage value of the positive voltage signal Vp and a value of a current that flows through the load element 56 by the current source 58. The load element 56 can be composed of a resistance element, a diode connection type MOS transistor, a source follower type MOS transistor or the like.

Here, in the switching period T3 in FIG. 4, in place of the positive voltage signal Vp, the reference power supply voltage VGND is supplied to the source (Ns11) or the drain (DL1) of the PMOS transistor switch 11, and the voltage Vbg11 having a predetermined voltage difference LSp to the positive side with respect to the reference power supply voltage VGND is supplied to the back gate of the PMOS transistor switch 11.

In addition, the voltage control circuit 55-1 includes a switch 59 that supplies the reference power supply voltage VGND to the back gate of the PMOS transistor switch 11 when it is turned on.

The switch 59 is controlled such that it is turned off when the PMOS transistor switch 11 is turned on and it is turned on when the PMOS transistor switch 11 is turned off. Therefore, in the negative-polarity drive period T4 in FIG. 4 in which the negative voltage signal Vn is output to the output terminal DL1, this control operates as an excess element withstand voltage preventing function that prevents the voltage difference between the drain (DL1) and the back gate of the PMOS transistor switch 11 when the negative voltage signal is output from exceeding the element withstand voltage.

In the time chart shown in FIG. 4, the switch 59 is turned on in the periods T4 and T1 in which the voltage control circuit 50 is inactive and the PMOS transistor switch is turned off, and is turned off in the periods T2 and T3 in which the voltage control circuit 50 is active and the PMOS transistor switch is turned on. The switch 59 is composed of, an NMOS transistor switch, and can be controlled by a complementary signal of the control signal S23 of the controller 101 shown in FIG. 2.

The voltage control circuit 55-1 maintains the back gate voltage Vbg11 of the PMOS transistor switch 11 at a potential higher than that of the voltage supplied to the source (Ns11) or the drain (DL1). Thereby, it is possible to prevent the generation of parasitic bipolar transistors with respect to a charging and discharging operation of the data line load when the PMOS transistor switch 11 is turned on.

Here, the back gate voltage Vbg11 changes following the positive voltage signal Vp. In addition, when the voltage difference between the back gate voltage Vbg11 and the positive voltage signal Vp is controlled to have a relatively small value, the on-resistance of the PMOS transistor switch 11 can be kept low.

Figure 6:
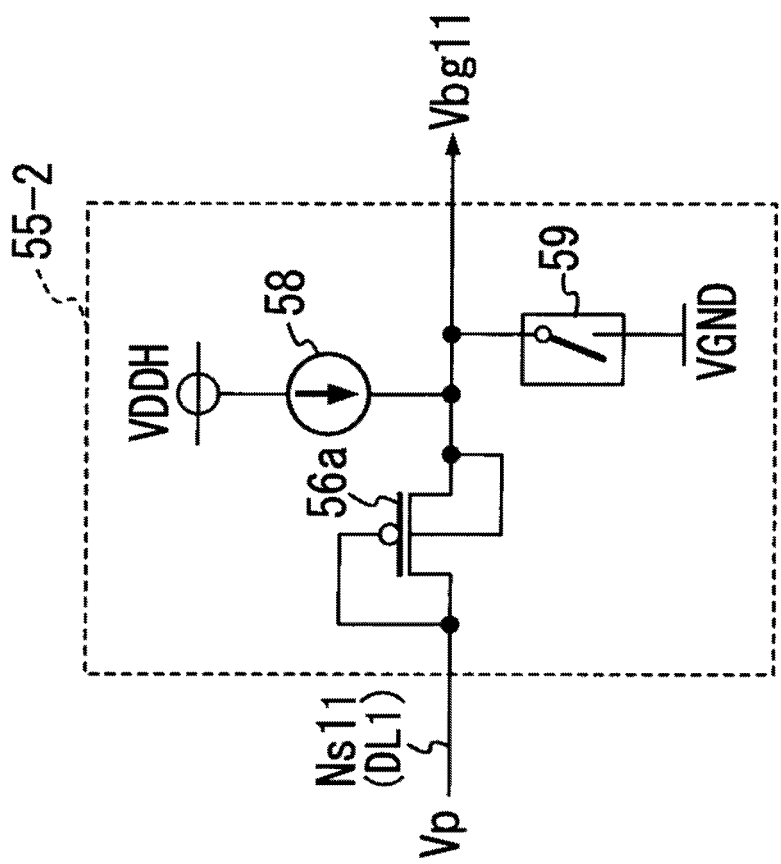
FIG. 6 is a circuit diagram showing a voltage control circuit 55-2 as a second example of the voltage control circuit 55.

FIG. 6 is a circuit diagram showing a configuration of a voltage control circuit 55-2 as a second example of the voltage control circuit 55.

In the voltage control circuit 55-2, the load element 56 shown in FIG. 5 is composed of a PMOS transistor 56a having a diode connection configuration, and the other configurations are the same as those shown in FIG. 5.

The drain and the gate of the PMOS transistor 56a are connected to the node Ns11 or the output terminal DL1, and the source and the back gate of the PMOS transistor 56a are connected to the back gate of the PMOS transistor switch 11. The configuration connecting the current source 58 and the switch 59 is the same as in FIG. 5.

The voltage difference LSp between the voltage (for example, the positive voltage signal Vp) supplied to the source (Ns11) or the drain (DL1) of the PMOS transistor switch 11 and the back gate voltage Vbg11 is set by the size of the PMOS transistor 56a and a value of a current that flows through the PMOS transistor 56a by the current source 58. According to the current value of the current source 58, the voltage difference LSp is set to a value that can prevent the generation of parasitic bipolar transistors. In addition, the PMOS transistor switch 11 and the PMOS transistor 56a are of the same conductive type, and when the back gates thereof are connected to each other, it is possible to reduce the influence of characteristic fluctuations due to variations in transistor production and to keep the on-resistance of the PMOS transistor switch 11 constant.

Here, the load element 56 can be composed of an NMOS transistor having a diode connection configuration in place of the PMOS transistor 56a having a diode connection configuration shown in FIG. 6. In this case, the influence of characteristic fluctuations due to variations in transistor production may occur to some extent.

Figure 7:
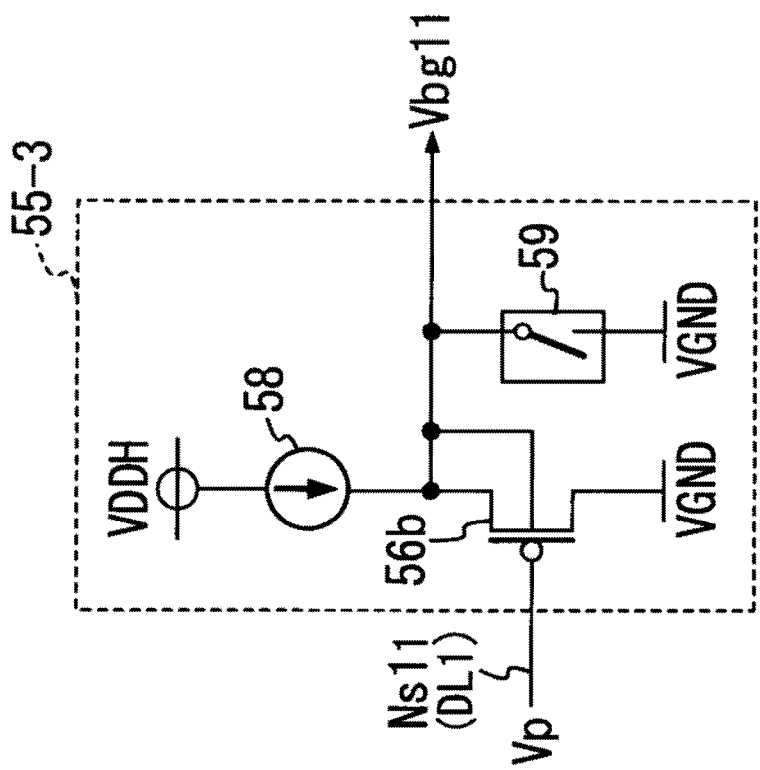
FIG. 7 is a circuit diagram showing a voltage control circuit 55-3 as a third example of the voltage control circuit 55.

FIG. 7 is a circuit diagram showing a configuration of a voltage control circuit 55-3 as a third example of the voltage control circuit 55.

In the voltage control circuit 55-3, the load element 56 shown in FIG. 5 is composed of a PMOS transistor 56b having a source follower configuration, and the other configurations are the same as those shown in FIG. 5.

The drain of the PMOS transistor 56b is connected to the reference power supply voltage VGND terminal, and the gate of the PMOS transistor 56b is connected to the node Ns11 or the output terminal DL1. In addition, the source and the back gate of the PMOS transistor 56b are connected to the back gate of the PMOS transistor switch 11.

The PMOS transistor 56b uses a source follower output that follows the voltage (for example, the positive voltage signal Vp) supplied to the source (Ns11) or the drain (DL1) of the PMOS transistor switch 11 and supplies it as the back gate voltage Vbg11 to the back gate of the PMOS transistor switch 11. A voltage difference LSp between the positive voltage signal Vp and the back gate voltage Vbg11 is set by the size of the PMOS transistor 56b and a value of a current that flows through the PMOS transistor 56b by the current source 58. According to the current value of the current source 58, the voltage difference LSp is set to a value that can prevent the generation of parasitic bipolar transistors.

In addition, the PMOS transistor switch 11 and the PMOS transistor 56b are of the same conductive type, and when the back gates thereof are commonly connected to each other, it is possible to reduce the influence of characteristic fluctuations due to variations in transistor production and to keep the on-resistance of the PMOS transistor switch 11 constant.

Figure 8:
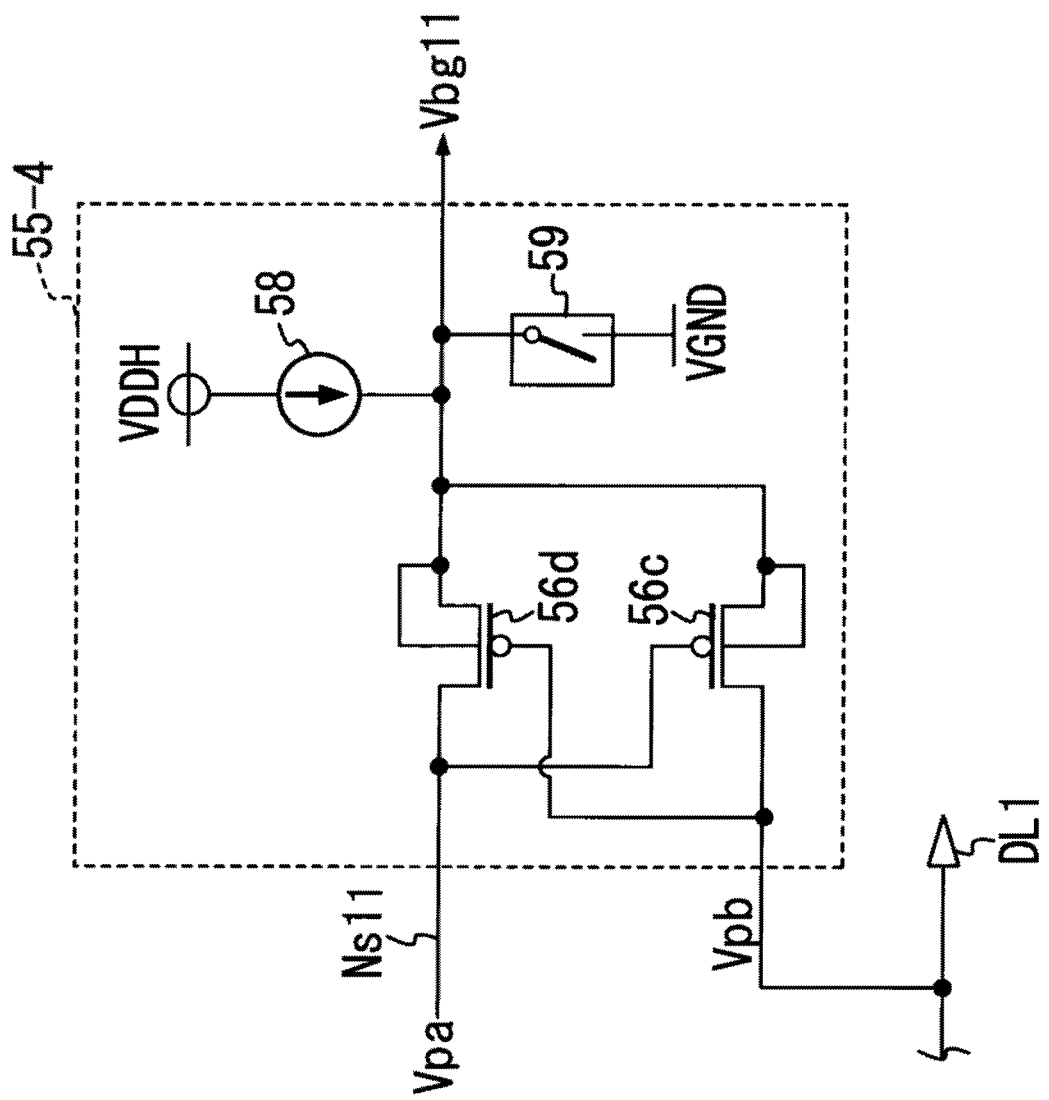
FIG. 8 is a circuit diagram showing a voltage control circuit 55-4 as a fourth example of the voltage control circuit 55.

FIG. 8 is a circuit diagram showing a configuration of a voltage control circuit 55-4 as a fourth example of the voltage control circuit 55.

In the voltage control circuit 55-4, in place of the diode connection type PMOS transistor 56a in the voltage control circuit 55-2 shown in FIG. 6, PMOS transistors 56c and 56d are used, and the other configurations are the same as those shown in FIG. 6.

In the PMOS transistor 56c, the drain is connected to the output terminal DL1, the gate is connected to the node Ns11, and the source and the back gate are connected to the back gate of the PMOS transistor switch 11.

In the PMOS transistor 56d, the drain is connected to the node Ns11, the gate is connected to the output terminal DL1, and the source and the back gate are connected to the back gate of the PMOS transistor switch 11. The configuration connecting the current source 58 and the switch 59 is the same as in FIG. 6.

The PMOS transistor switch 11 and the PMOS transistors 56c and 56d are of the same conductive type, and when the back gates thereof are commonly connected to each other, it is possible to reduce the influence of characteristic fluctuations due to variations in transistor production and to keep the on-resistance of the PMOS transistor switch 11 constant.

Next, the operation of the voltage control circuit 55-4 shown in FIG. 8 will be described.

In FIG. 8, the voltages of the transient node Ns11 and the output terminal DL1 when the voltage changes in the positive voltage signal Vp are set as Vpa and Vpb, respectively. In this case, when the voltage of the output terminal DL1 is stable, that is, when the voltage value is constant, Vpa=Vpb=Vp is satisfied.

For example, when the voltages Vpa and Vpb are transiently different during high-speed and significant voltage change of the positive voltage signal Vp, a large current flows through one of the PMOS transistor 56c and 56d, that is, the PMOS transistor in which the gate receives the lower voltage between the voltages Vpa and Vpb. In this case, the voltage of the other drain of the PMOS transistor 56c or 56d is the higher voltage between the voltages Vpa and Vpb. Thereby, the back gate voltage Vbg11 of the PMOS transistor switch 11 is controlled to be a voltage higher than both the voltages Vpa and Vpb of the source and the drain. Therefore, it is possible to reliably prevent the operation of the parasitic bipolar transistor even with a sudden voltage fluctuation of the positive voltage signal Vp.

Next, an example of the fourth voltage control circuit 65 of the output circuit 100 shown in FIG. 2 will be described.

Figure 9:
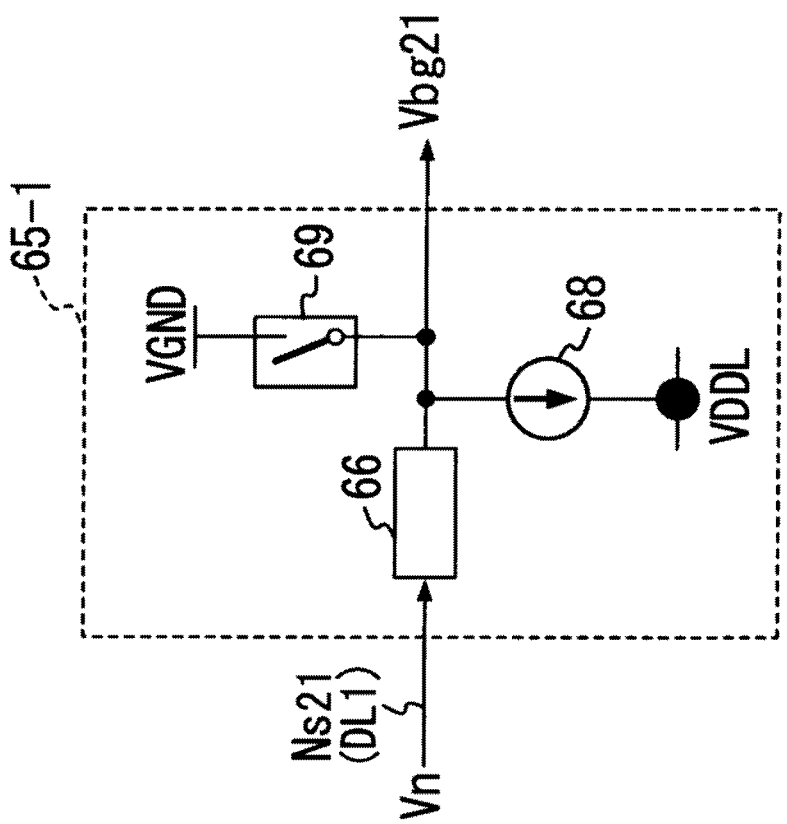
FIG. 9 is a circuit diagram showing a voltage control circuit 65-1 as a first example of the voltage control circuit 65.

FIG. 9 is a circuit diagram showing a configuration of a voltage control circuit 65-1 as a first example of the voltage control circuit 65.

The voltage control circuit 65-1 shown in FIG. 9 controls a voltage supplied to the back gate of the NMOS transistor switch 21. When the NMOS transistor switch 21 is turned on, the voltage control circuit 65-1 supplies a voltage of which the level is shifted to the low voltage by the predetermined voltage difference LSn with respect to the voltage (the negative voltage signal Vn or the reference power supply voltage VGND) supplied to the source (Ns21) or the drain (DL1) of the NMOS transistor switch 21 as the back gate voltage Vbg21 to the back gate of the NMOS transistor switch 21.

The voltage control circuit 65-1 shown in FIG. 9 includes a load element 66 of which one end is connected to the back gate of the NMOS transistor switch 21 and a current source 68 that sets a value of a current that flows through the load element 66.

When the NMOS transistor switch 21 is turned on, the load element 66 receives the voltage (for example, the negative voltage signal Vn) supplied to the source (Ns21) or the drain (DL1) of the NMOS transistor switch 21 at one end thereof, and as shown in FIG. 3B, supplies the back gate voltage Vbg21 of which the level is shifted to the negative side by the predetermined voltage difference LSn with respect to the negative voltage signal Vn to the back gate of the NMOS transistor switch 21 via the other end thereof.

Here, the voltage value of the back gate voltage Vbg21 is controlled such that it is lower than the negative voltage signal Vn and equal to or higher than the negative power supply voltage VDDL. A voltage difference LSn between the negative voltage signal Vn and the back gate of the NMOS transistor switch 21 is set by the negative voltage signal Vn and a value of a current that flows through the load element 66 by the current source 68. The load element 66 can be composed of a resistance element, a diode connection type MOS transistor, a source follower type MOS transistor or the like.

Here, in the switching period T1 in FIG. 4, in place of the negative voltage signal Vn, the reference power supply voltage VGND is supplied to the source (Ns21) or the drain (DL1) of the NMOS transistor switch 21, and the voltage Vbg21 having a predetermined voltage difference LSn to the negative side with respect to the reference power supply voltage VGND is supplied to the back gate of the NMOS transistor switch 21.

In addition, the voltage control circuit 65-1 includes a switch 69 that supplies the reference power supply voltage VGND to the back gate of the NMOS transistor switch 21 when it is turned on.

The switch 69 is controlled such that it is turned off when the NMOS transistor switch 21 is turned on and it is turned on when the NMOS transistor switch 21 is turned off. Therefore, in the positive-polarity drive period T2 in FIG. 4 in which the positive voltage signal Vp is output from the output terminal DL1, this control operates as an excess element withstand voltage preventing function that prevents the voltage difference between the drain (DL1) and the back gate of the NMOS transistor switch 21 when the positive voltage signal is output from exceeding the element withstand voltage.

Here, in the time chart shown in FIG. 4, the switch 69 is turned off in the periods T4 and T1 in which the voltage control circuit 60 is active and the NMOS transistor switch 21 is turned on, and is turned on in the periods T2 and T3 in which the voltage control circuit 60 is inactive state and the NMOS transistor switch 21 is turned off. The switch 69 is, for example, composed of a PMOS transistor switch, and can be controlled by a complementary signal of the control signal S13 of the controller 101 shown in FIG. 2.

The above voltage control circuit 65-1 maintains the back gate voltage Vbg21 supplied to the back gate of the NMOS transistor switch 21 at a potential lower than that of the voltage supplied to the source (Ns21) or the drain (DL1). Thereby, it is possible to prevent the generation of parasitic bipolar transistors with respect to a charging and discharging operation of the data line load when the NMOS transistor switch 21 is turned on.

Here, the back gate voltage Vbg21 changes following the negative voltage signal Vn, but when the voltage difference between the back gate voltage Vbg21 and the negative voltage signal Vn is controlled to have a relatively small value, the on-resistance of the NMOS transistor switch 21 can be kept low. In addition, the load element 66 of the voltage control circuit 65-1 can be composed of a resistance element, a diode connection type MOS transistor, a source follower type MOS transistor, or the like, similarly to a specific example or an application example of the load element 56 of the voltage control circuit 55-1 shown in FIG. 5, and for example, the load elements 56a, 56b, 56c, and 56d shown in FIG. 6 to FIG. 8.

Next, an example of the first voltage control circuit 50 of the output circuit 100 shown in FIG. 2 will be described.

Figure 10:
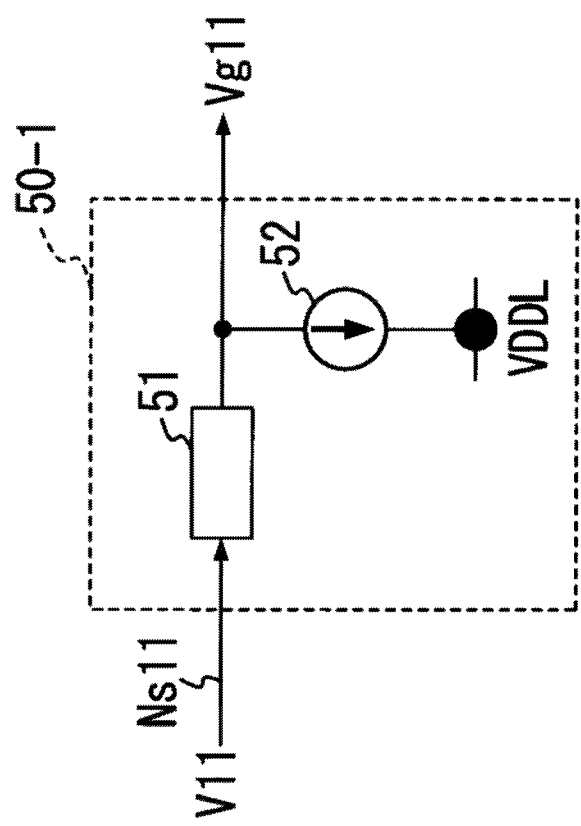
FIG. 10 is a circuit diagram showing a voltage control circuit 50-1 as a first example of a voltage control circuit 50.

FIG. 10 is a circuit diagram showing a configuration of a voltage control circuit 50-1 as a first example of the voltage control circuit 50.

The voltage control circuit 50-1 supplies a voltage obtained by shifting the level of the voltage V11 received in the source of the PMOS transistor switch 11 via the node Ns11 to the low voltage side as the gate voltage Vg11 to the gate of the PMOS transistor switch 11.

As shown in FIG. 10, the voltage control circuit 50-1 includes a load element (or load circuit) 51 of which one end is connected to the gate of the PMOS transistor switch 11 and a current source 52 that sets a value of a current that flows through the load element 51. The load element 51 receives the voltage V11 of the node Ns11 supplied to the source of the PMOS transistor switch 11, generates a voltage that is lower than the voltage V11 by a predetermined voltage difference as the gate voltage Vg11, and supplies it to the gate of the PMOS transistor switch 11. The potential difference between both ends of the load element 51, that is, the voltage difference between the source (the node Ns11) and the gate of the PMOS transistor switch 11 is set by the on-resistance of the load element 51 and the current value of the current source 52. That is, the voltage difference is set to be larger than the threshold voltage (absolute value) of the PMOS transistor switch 11, that is, the voltage difference at which the PMOS transistor switch 11 maintains the on state.

Here, the load element 51 can be composed of a resistance element or a diode connection type MOS transistor connected between the node Ns11 and the gate of the PMOS transistor switch 11. In addition, the load element 51 can be composed of a source follower type NMOS transistor in which the gate receives the voltage V11, the source is connected to the gate of the PMOS transistor switch 11, and the drain is connected to a predetermined power supply voltage terminal. In addition, for example, the current source 52 is connected between the negative power supply voltage VDDL and the gate of the PMOS transistor switch 11. Here, in place of the negative power supply voltage VDDL, the negative-polarity side low power supply voltage VCCL may be used.

The voltage between terminals of each element of the voltage control circuit 50-1 is less than the withstand voltage VDDT, the gate voltage Vg11 is a voltage lower than the voltage V11 of the node Ns11, and the voltage difference from the voltage V11 is controlled such that it is less than the withstand voltage VDDT.

Figure 11:
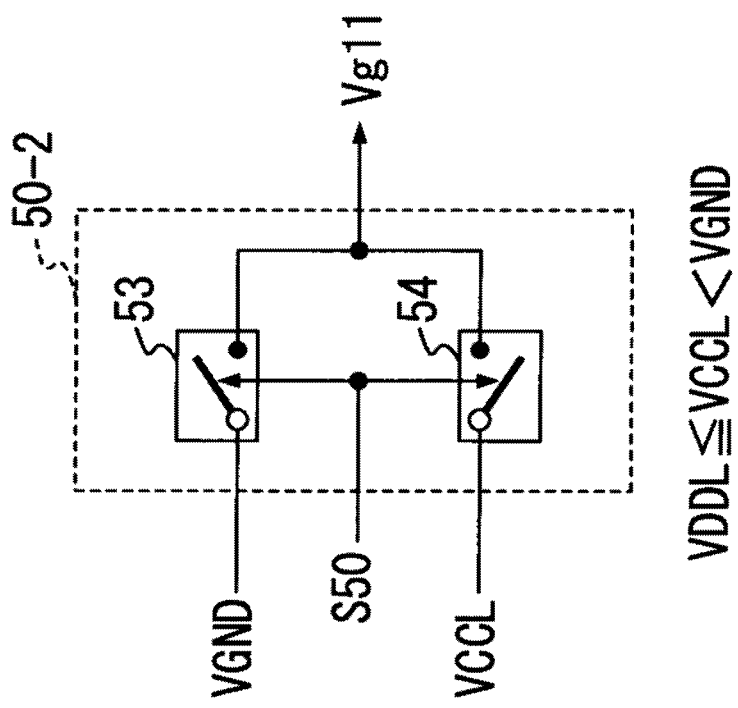
FIG. 11 is a circuit diagram showing a voltage control circuit 50-2 as a second example of the voltage control circuit 50.

FIG. 11 is a circuit diagram showing a configuration of a voltage control circuit 50-2 as a second example of the voltage control circuit 50.

The voltage control circuit 50-2 supplies a predetermined power supply voltage as the gate voltage Vg11 to the gate of the PMOS transistor switch 11 according to the voltage V11 received by the source of the PMOS transistor switch 11. The voltage control circuit 50-2 includes switches 53 and 54 that selectively supply one of the reference power supply voltage VGND and the negative-polarity side low power supply voltage VCCL to the gate of the PMOS transistor switch 11. For example, each of the switches 53 and 54 is on/off controlled by the control signal S50 generated by the controller 101.

The control signal S50 may be controlled based on, for example, the logical value (0, 1) of a predetermined bit of digital data corresponding to the positive voltage signal Vp (=V11) supplied to the source of the PMOS transistor switch 11. For example, when the voltage value of the positive voltage signal Vp becomes a value on the side of the positive power supply voltage VDDH, according to the control signal S50, the switches 53 and 54 are turned on and off. Thereby, the gate voltage Vg11 having the reference power supply voltage VGND is supplied to the gate of the PMOS transistor switch 11. On the other hand, when the voltage value of the positive voltage signal Vp becomes a value on the side of the reference power supply voltage VGND, the switches 53 and 54 are turned off and on according to the control signal S50. Thereby, the gate voltage Vg11 having the negative-polarity side low power supply voltage VCCL is supplied to the gate of the PMOS transistor switch 11.

Here, FIG. 10 and FIG. 11 show an example (50-1, 50-2) of a specific circuit of the voltage control circuit 50, but the circuit configuration is not limited thereto. In short, the circuit form of the voltage control circuit 50 is not limited as long as it can be formed with a voltage less than the low withstand voltage VDDT and it can maintain the PMOS transistor switch 11 in an on state when the first control device 13 shown in FIG. 2 is inactive (the switch 13 is turned off).

Next, an example of the second voltage control circuit 60 of the output circuit 100 shown in FIG. 2 will be described.

Figure 12:
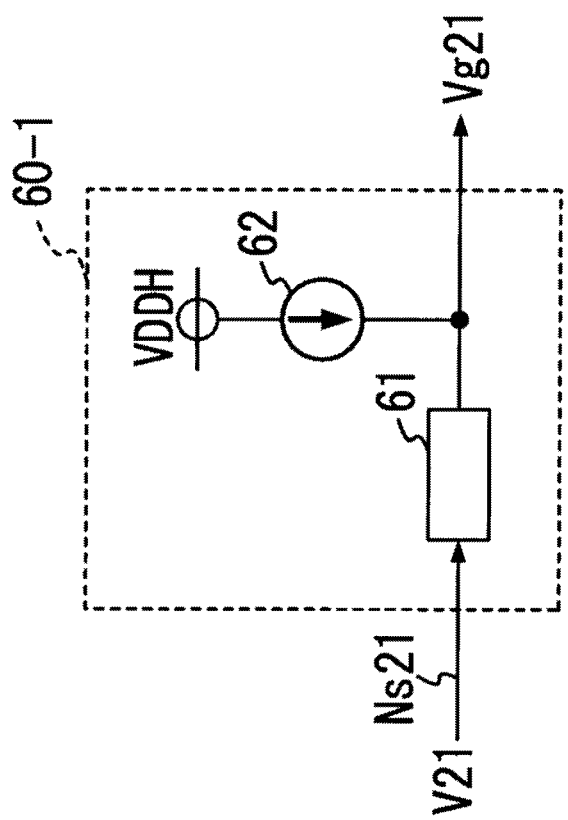
FIG. 12 is a circuit diagram showing a voltage control circuit 60-1 as a first example of a voltage control circuit 60.

FIG. 12 is a circuit diagram showing a configuration of a voltage control circuit 60-1 as a first example of the voltage control circuit 60.

The voltage control circuit 60-1 supplies a voltage obtained by shifting the level of the voltage V21 received by the source of the NMOS transistor switch 21 via the node Ns21 to the high voltage side as the gate voltage Vg21 to the gate of the NMOS transistor switch 21.

As shown in FIG. 12, the voltage control circuit 60-1 includes a load element (or load circuit) 61 of which one end is connected to the gate of the NMOS transistor switch 21 and a current source 62 that sets a value of a current that flows through the load element 61. The load element 61 receives the voltage V21 of the node Ns21 supplied to the source of the NMOS transistor switch 21, generates a voltage that is higher than the voltage V21 by a predetermined voltage difference as the gate voltage Vg21, and supplies it to the gate of the NMOS transistor switch 21.

The potential difference between both ends of the load element 61, that is, the voltage difference between the source (the node Ns21) and the gate of the NMOS transistor switch 21, is set by the on-resistance of the load element 61 and the current value of the current source 62. That is, the voltage difference is set to be larger than the threshold voltage of the NMOS transistor switch 21, that is, the voltage difference at which the NMOS transistor switch 21 maintains the on state.

Here, the load element 61 can be composed of a resistance element or a diode connection type MOS transistor connected between the node Ns21 and the gate of the NMOS transistor switch 21. In addition, the load element 61 can be composed of a source follower type PMOS transistor in which the gate receives the voltage V21, the source is connected to the gate of the NMOS transistor switch 21, and the drain is connected to a predetermined power supply voltage terminal. In addition, for example, the current source 62 is connected between the positive power supply voltage VDDH and the gate of the NMOS transistor switch 21. Here, in place of the positive power supply voltage VDDH, the positive-polarity side low power supply voltage VCCH may be used.

The voltage between terminals of each element of the voltage control circuit 60-1 is less than the withstand voltage VDDT, the gate voltage Vg21 is a voltage higher than the voltage V21 of the node Ns21, and the voltage difference from the voltage V21 is controlled such that it is less than the withstand voltage VDDT.

Figure 13:
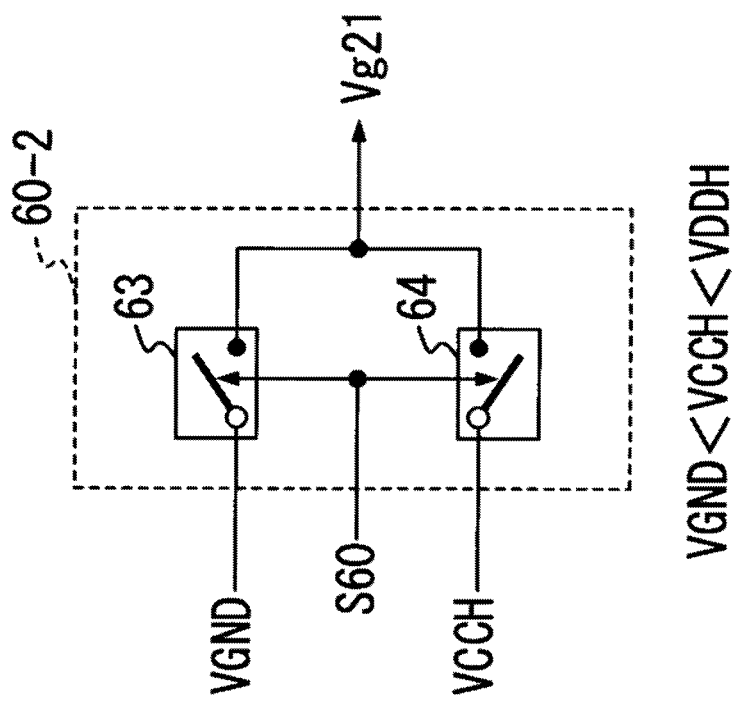
FIG. 13 is a circuit diagram showing a voltage control circuit 60-2 as a second example of the voltage control circuit 60.

FIG. 13 is a circuit diagram showing a configuration of a voltage control circuit 60-2 as a second example of the voltage control circuit 60.

The voltage control circuit 60-2 supplies a predetermined power supply voltage as the gate voltage Vg21 to the gate of the NMOS transistor switch 21 according to the voltage V21 received by the source of the NMOS transistor switch 21.

The voltage control circuit 60-2 includes switches 63 and 64 that selectively supply one of the reference power supply voltage VGND and the positive-polarity side low power supply voltage VCCH to the gate of the NMOS transistor switch 21. For example, each of the switches 63 and 64 is on/off controlled by the control signal S60 generated by the controller 101.

The control signal S60 may be controlled based on, for example, the logical value (0, 1) of a predetermined bit of digital data corresponding to the negative voltage signal Vn (=V21) supplied to the source of the NMOS transistor switch 21. For example, when the voltage value of the negative voltage signal Vn becomes a value on the side of the negative power supply voltage VDDL, the switches 63 and 64 are turned on and off according to the control signal S60. Thereby, the gate voltage Vg21 having the reference power supply voltage VGND is supplied to the gate of the NMOS transistor switch 21. On the other hand, when the voltage value of the negative voltage signal Vn becomes a value on the side of the reference power supply voltage VGND, the switches 63 and 64 are turned off and on according to the control signal S60. Thereby, the positive-polarity side low power supply voltage VCCH is supplied to the gate of the NMOS transistor switch 21.

Here, FIG. 12 and FIG. 13 show an example (60-1, 60-2) of a specific circuit of the voltage control circuit 60, but the circuit configuration is not limited thereto. In short, the circuit form of the voltage control circuit 60 is not limited as long as it can be formed with a voltage less than the withstand voltage VDDT and it can maintain the NMOS transistor switch 21 in an on state when the second control device 23 shown in FIG. 2 is inactive (the switch 23 is turned off).

Example 2

Figure 14:
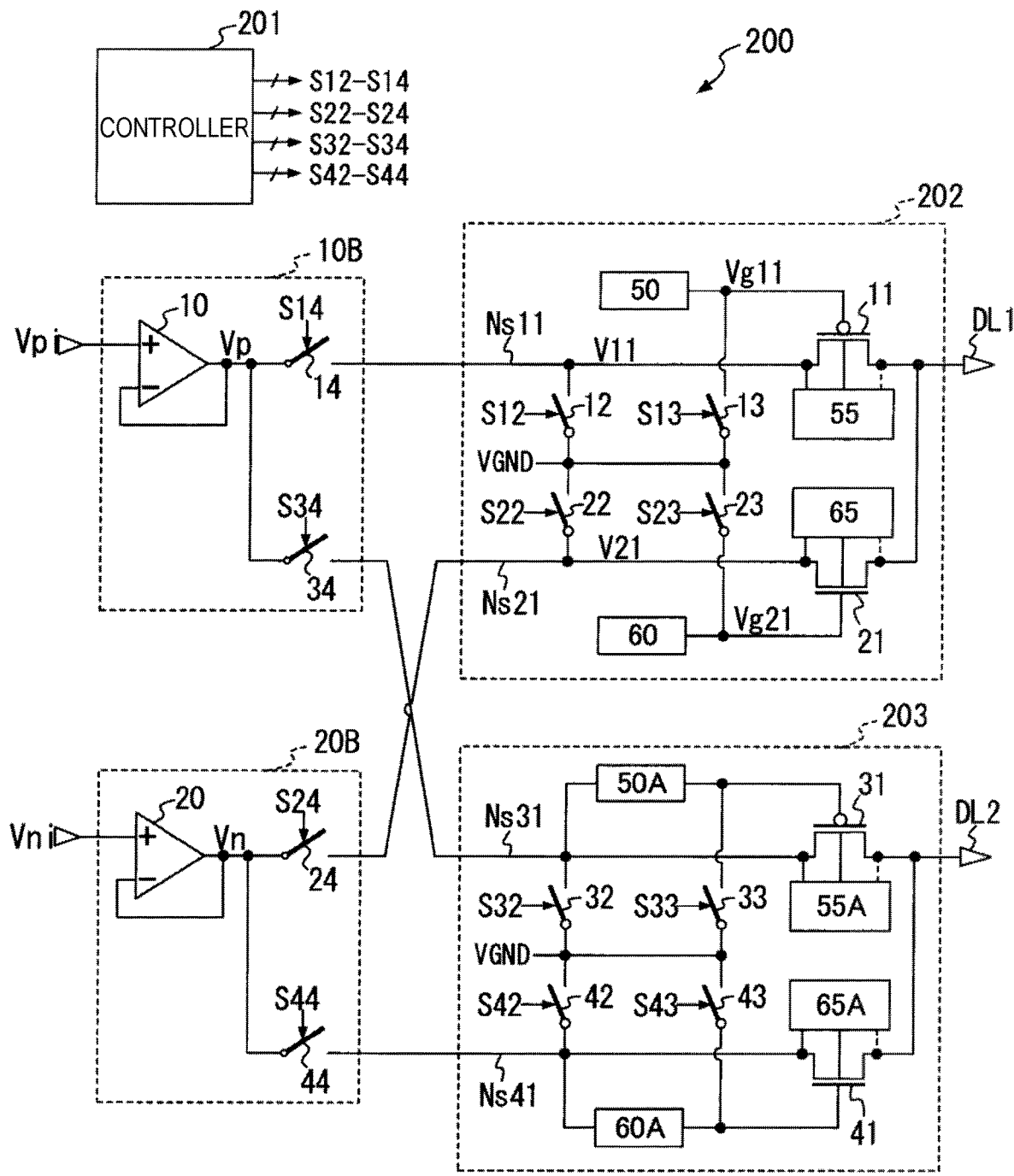
FIG. 14 is a circuit diagram showing a configuration of an output circuit 200 as a second example of an output circuit according to the disclosure.

FIG. 14 is a circuit diagram showing a configuration of an output circuit 200 as another example of an output circuit according to the disclosure.

The output circuit 100 shown in FIG. 2 alternately outputs a positive voltage signal or a negative voltage signal to one data line load, but the output circuit 200 shown in FIG. 14 outputs a positive voltage signal to one of two data line loads and a negative voltage signal to the other thereof, and performs polarity inversion driving in which the polarities are alternately switched.

Here, in the output circuit 200 shown in FIG. 14, a positive voltage signal supply circuit 10B is used in place of the positive voltage signal supply circuit 10A shown in FIG. 2, a negative voltage signal supply circuit 20B is used in place of the negative voltage signal supply circuit 20A, and a controller 201 is used in place of the controller 101. In addition, in the output circuit 200 shown in FIG. 14, an output terminal DL2, switches 32, 34, 42 and 44, control devices 33 and 43, output selection switches 31 and 41, and voltage control circuits 50A, 60A, 55A and 65A are newly provided, and the other configurations are the same as those shown in FIG. 2.

In FIG. 14, the positive voltage signal supply circuit 10B controls supply and cut off of the positive voltage signal Vp (VGND<Vp<VDDH) to and from two nodes Ns11 and Ns31. The negative voltage signal supply circuit 20B controls supply and cut off of the negative voltage signal Vn (VGND>Vn>VDDL) to two nodes Ns21 and Ns41.

The output selection switch 31 is composed of a PMOS transistor switch (hereinafter referred to as the PMOS transistor switch 31) in which the source is connected to the node Ns31, and the drain is connected to the output terminal DL2.

The output selection switch 41 is composed of an NMOS transistor switch (hereinafter referred to as the NMOS transistor switch 41) in which the source is connected to the node Ns41, and the drain is connected to the output terminal DL2.

For example, the switch 32 is composed of an NMOS transistor switch connected between the node Ns31 and the reference power supply terminal that supplies the reference power supply voltage VGND. For example, the switch 42 is composed of a PMOS transistor switch connected between the node Ns41 and the reference power supply terminal.

The control device 33 is composed of, for example, the PMOS transistor switch 33 (hereinafter simply referred to as the switch 33) connected between the gate of the PMOS transistor switch 31 and the reference power supply terminal. The control device 33 is controlled in connection with control of the on state of the switch 32, and when it is turned on together with the switch 32, the reference power supply voltage VGND is supplied to the gate of the PMOS transistor switch 31, and the PMOS transistor switch 31 is controlled such that it is brought into an off state. The control device 34 is composed of, for example, the NMOS transistor switch 43 (hereinafter simply referred to as the switch 43) connected between the gate of the NMOS transistor switch 41 and the reference power supply terminal. The control device 34 is controlled in connection with control of the on state of the switch 42, and when it is turned on together with the switch 42, the reference power supply voltage VGND is supplied to the gate of the NMOS transistor switch 41, and the NMOS transistor switch 41 is controlled such that it is brought into in an off state.

Here, FIG. 14 shows an example in which the control devices 33 and 34 are composed of switches.

The voltage control circuit 50A is connected to the gate of the PMOS transistor switch 31, and like the voltage control circuit 50, and it is active when the control device 33 is inactive (the switch 33 is turned off), and the PMOS transistor switch 31 is controlled such that it is brought into an on state. Here, when the control device 33 is active (the switch 33 is turned on), the voltage control circuit 50A is inactive. The voltage control circuit 60A is connected to the gate of the NMOS transistor switch 41, and like the voltage control circuit 60, it is active when the control device 43 is inactive (the switch 43 is turned off), and the NMOS transistor switch 41 is controlled such that it is brought into an on state. Here, when the control device 43 is active (the switch 43 is turned on), the voltage control circuit 60A is inactive.

The voltage control circuit 55A is connected to the back gate of the PMOS transistor switch 31, and controls the back gate voltage of the PMOS transistor switch 31 in order to prevent the operation of the parasitic bipolar transistor like the voltage control circuit 55. The voltage control circuit 65A is connected to the back gate of the NMOS transistor switch 41, and controls the back gate voltage of the NMOS transistor switch 41 in order to prevent the operation of the parasitic bipolar transistor like the voltage control circuit 65.

In FIG. 14, a circuit 202 included between the nodes Ns11 and Ns21 and the output terminal DL1, and a circuit 203 included between the nodes Ns31 and Ns41 to the output terminal DL2 have the same functions, and when one of them performs an operation of outputting a positive voltage signal, the other performs an operation of outputting a negative voltage signal.

The positive voltage signal supply circuit 10B shown in FIG. 14 is the positive voltage signal supply circuit 10A shown in FIG. 2 to which the switch 34 that controls supply and cut off of the positive voltage signal Vp to and from the node Ns31 is added. The switch 34 is also composed of a CMOS switch in order for the positive voltage signal Vp in a wide voltage range to pass through like the switch 14. Here, the amplifier circuit 10 included in the positive voltage signal supply circuit 10B may include functions of the switches 14 and 34 internally.

The negative voltage signal supply circuit 20B is the negative voltage signal supply circuit 20A shown in FIG. 2 to which the switch 44 that controls supply and cut off of the negative voltage signal Vn to and from the node Ns41 is added. The switch 44 is composed of a CMOS switch in order for the negative voltage signal Vn in a wide voltage range to pass through like the switch 24. Here, the amplifier circuit 20 included in the negative voltage signal supply circuit 20B may include functions of the switches 24 and 44 internally.

In the output circuit 200 shown in FIG. 14, when the positive voltage signal Vp is output to the output terminal DL1, each of the switches 12 to 14 and 22 to 24 that controls the output to the output terminal DL1 is subjected to on/off control in the same manner as in the positive-polarity drive period T2 (including the switching period before and after) in FIG. 4. In this case, each of the switches 32 to 34 and 42 to 44 that control the output to the output terminal DL2 is subjected to control in the same manner as in the negative-polarity drive period T4 (including the switching period before and after) of the switches 12 to 14 and 22 to 24, and the negative voltage signal Vn is output to the output terminal DL2.

In addition, when the negative voltage signal Vn is output to the output terminal DL1, each of the switches 12 to 14 and 22 to 24 that control the output to the output terminal DL1 is subjected to on/off control in the same manner as in the negative-polarity drive period T4 (including the switching period before and after) in FIG. 4. In this case, each of the switches 32 to 34 and 42 to 44 that control the output to the output terminal DL2 is subjected to control in the same manner as in the positive-polarity drive period T2 (including the switching period before and after) of the switches 12 to 14 and 22 to 24, and the positive voltage signal Vp is output to the output terminal DL2.

The controller 201 generates the above control signals S11 to S13 and S22 to S24 at the timing shown in FIG. 4 in the same manner as in the controller 101 shown in FIG. 2. In addition, the controller 201 generates control signals S32 to S34, and S42 to S44 in the above signal form. Here, when the switches 14, 24, 34, and 44 each are composed of a complementary switch, complementary signals of S14, S24, S34, and S44 are also generated by the controller 201. In addition, although not shown in FIG. 14, the controller 201 also generates control signals necessary for controlling the switches 59 and 69 included in the voltage control circuits 55 and 65, and the switches included in the voltage control circuits 55A and 65A, and the voltage control circuits 50, 60, 50A, and 60A.

In this manner, in the output circuit 200 shown in FIG. 14, drive control shown in FIG. 4 is also performed in the same manner as in the output circuit 100. However, regarding drive control for the output terminal DL2, in the drive control shown in FIG. 4, the supply period of the positive voltage signal Vp and the supply period of the negative voltage signal Vn are interchanged. That is, when the positive voltage signal Vp is supplied to the output terminal DL1, the negative voltage signal Vn is supplied to the output terminal DL2, and when the negative voltage signal Vn is supplied to the output terminal DL1, the positive voltage signal Vp is supplied to the output terminal DL2.

In addition, also in the output circuit 200 shown in FIG. 14, similarly to the output circuit 100, since each element can be composed of a low withstand voltage element, it is possible to reduce the area of the output circuit and reduce costs.

Figure 15:
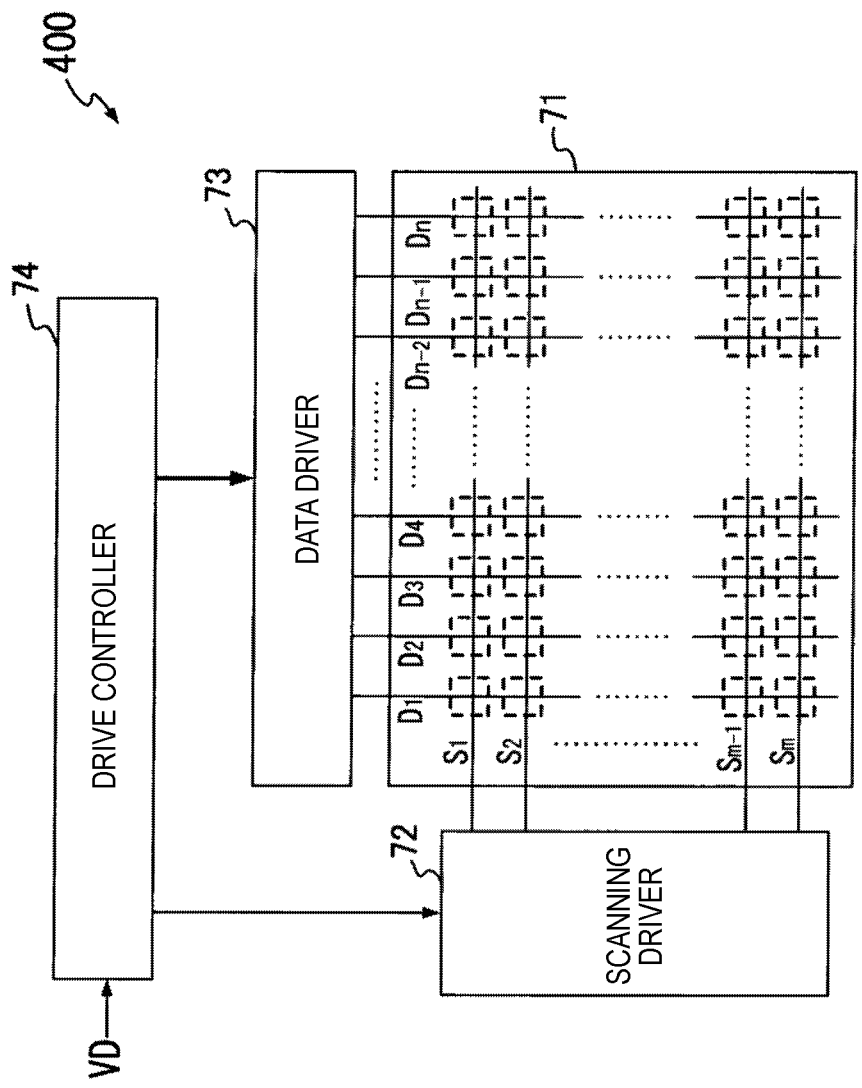
FIG. 15 is a block diagram showing a configuration of a display device 400 including a data driver 73 including an output circuit according to the disclosure.

FIG. 15 is a block diagram showing a schematic configuration of a liquid crystal display device 400 including a data driver 73 including an output circuit according to the disclosure.

In FIG. 15, in an active matrix type display panel 71 including a liquid crystal display device for each pixel unit, m (m is a natural number of 2 or more) horizontal scanning lines S1 to Sm extending in a horizontal direction of a 2D screen and n (n is a natural number of 2 or more) data lines D1 to Dn extending in a vertical direction of the 2D screen are formed. A display cell responsible for a pixel is formed at each intersection between the horizontal scanning lines and the data lines. The display cell includes at least a switch element and a pixel electrode, and when the switch element is turned on according to a scanning pulse of the horizontal scanning line, the gradation voltage signal of the data line is applied to the pixel electrode via the switch element, and the luminance of the liquid crystal display device is controlled according to the gradation voltage applied to the pixel electrode. Here, in FIG. 15, a specific configuration of the display cell will not be described.

A drive controller 74 receives a video signal VD in which a control signal and the like are integrated, generates a timing signal based on the horizontal synchronization signal from the video signal VD, and supplies it to a scanning driver 72. In addition, the drive controller 74 generates various control signal groups based on the video signal VD and a series of pixel data PD indicating the luminance level of each pixel with, for example, 8-bit luminance gradation, and supplies them to the data driver 73.

The scanning driver 72 sequentially applies horizontal scanning pulses to the horizontal scanning lines S1 to Sm of the display panel 71 based on the timing signal supplied from the drive controller 74.

The data driver 73 is formed in, for example, a semiconductor device such as a large-scale integrated (LSI) circuit. The data driver 73 converts the pixel data PD supplied from the drive controller 74 into gradation voltage signals G1 to Gn having a gradation voltage corresponding to each piece of pixel data PD for one horizontal scanning line, that is, every n pixels. Then, the data driver 73 applies the gradation voltage signals G1 to Gn to the data lines D1 to Dn of the display panel 71. Here, in the scanning driver 72 or the data driver 73, a part or all of the circuit may be integrally formed with a display panel. In addition, the data driver 73 may be composed of a plurality of LSIs.

Figure 16:
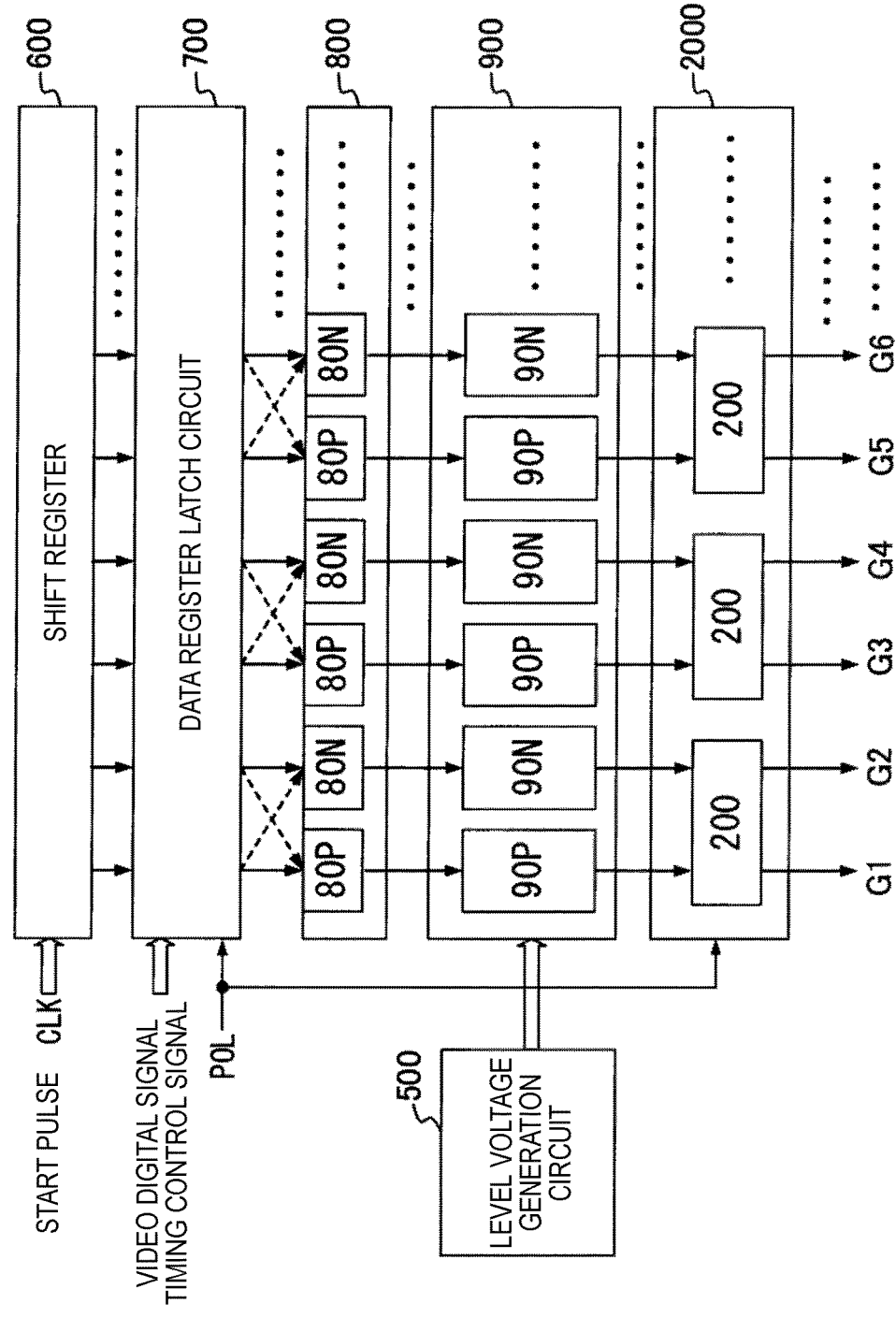
FIG. 16 is a block diagram showing an internal configuration of the data driver 73.

FIG. 16 is a block diagram showing an internal configuration of the data driver 73.

As shown in FIG. 16, the data driver 73 includes a shift register 600, a data register latch circuit 700, a level shift circuit 800, a level voltage generation circuit 500, a decoder circuit 900, and an output amplifier circuit 2000. In addition, the data driver 73 also includes an interface circuit (not shown) that receives control signals and video digital signals supplied from the drive controller 74 in FIG. 15, generates necessary clock signals and control signals inside the driver, and outputs a signal group whose timing has been adjusted with the video digital signal. In FIG. 16, for convenience of explanation, details of the interface circuit will be omitted.

Here, regarding the power supply voltage, at least the reference power supply voltage VGND and the positive-polarity side low power supply voltage VCCH are supplied to the shift register 600 and the data register latch circuit 700, and the negative-polarity side low power supply voltage VCCL is also supplied to the block in which a negative-polarity side signal is generated. At least the reference power supply voltage VGND, the positive power supply voltage VDDH and the negative power supply voltage VDDL are supplied to the level shift circuit 800, the level voltage generation circuit 500, the decoder circuit 900, and the output amplifier circuit 2000.

The shift register 600 generates a plurality of latch timing signals for selecting a latch in synchronization with the clock signal CLK according to the start pulse, and supplies them to the data register latch circuit 700.

The data register latch circuit 700 receives a video digital signal, a polarity inversion signal (POL), a timing control signal, and the like, captures each predetermined number of video digital signals based on each latch timing signal supplied from the shift register 600, and supplies the predetermined number of video digital signals to the level shift circuit 800 at the latch timing.

Here, the data register latch circuit 700 selectively outputs a video digital signal to a level shifter 80P or 80N corresponding to a positive polarity or a negative polarity based on the polarity inversion signal (POL).

The level shift circuit 800 includes the level shifter 80P for positive polarity and the level shifter 80N for negative polarity. The level shifter 80P for positive polarity converts a low-amplitude (VGND/VCCH) video digital signal into an analog-voltage amplitude (VGND/VDDH) positive video digital signal. The level shifter 80N for negative polarity converts a low-amplitude (VGND/VCCL) video digital signal into an analog-voltage amplitude (VGND/VDDL) negative video digital signal. A predetermined number of video digital data signals supplied from the data register latch circuit 700 are sent to the level shifter 80P for positive polarity or the level shifter 80N for negative polarity according to the polarity inversion signal (POL), widened to the analog voltage amplitude corresponding to each polarity, and sent to a positive-polarity decoder 90P or a negative-polarity decoder 90N.

The decoder circuit 900 is composed of a set of the positive-polarity decoder 90P and the negative-polarity decoder 90N for every two outputs. Here, the order of the decoders 90P and 90N for each polarity in the decoder circuit 900 can be changed.

The level voltage generation circuit 500 generates a plurality of level voltages having different voltage values for positive polarity and negative polarity, and supplies them to the decoders 90P and 90N.

The decoder circuit 900 selects a level voltage corresponding to the video digital signal after level shift processing from among the plurality of level voltages in units of two outputs of a set of the positive-polarity decoder 90P and the negative-polarity decoder 90N, and supplies the level voltage selected for each polarity to the output amplifier circuit 2000.

The output amplifier circuit 2000 is composed of, for example, the output circuit 200 in FIG. 14. The output amplifier circuit 2000 receives a polarity inversion signal (POL) and a switch control signal group, computes and amplifies the level voltage for each polarity selected by the decoder circuit 900, and outputs a positive voltage signal (Vp) to one terminal and a negative voltage signal (Vn) to the other terminal for each of two output terminals of the data driver according to the polarity inversion signal (POL). Here, in the output amplifier circuit 2000, according to the polarity inversion signal (POL), for example, the control signals S12, S13, S14, S22, S23, S24, S32, S33, S34, S42, S43, and S44 of the output circuit 200 in FIG. 14 are controlled, and the on/off of the switches 12, 13, 14, 22, 23, 24, 32, 33, 34, 42, 43, and 44 is controlled. Here, the controller 201 that generates each control signal in FIG. 14 may be provided in common with a plurality of output circuits 200 of the output amplifier circuit 2000.

In the block diagram of the data driver of FIG. 16, blocks having a voltage range of the analog voltage amplitude are the level shift circuit 800, the decoder circuit 900, the output amplifier circuit 2000, and the level voltage generation circuit 500.

In addition, the level voltage generation circuit 500 can be divided into a positive-polarity analog voltage range (VGND to VDDH) and a negative-polarity analog voltage range (VGND to VDDL). The output amplifier circuit 2000 can also be composed of elements having withstand voltages in the positive-polarity analog voltage range (VGND to VDDH) and the negative-polarity analog voltage range (VGND to VDDL).

That is, the data driver in FIG. 16 outputs liquid crystal drive voltage signals in a voltage range of the negative voltage signal and positive voltage signal VDDL to VDDH to the output terminal, but the elements constituting the data driver can be composed of elements having a low withstand voltage VDDT that can operate in a positive-polarity analog voltage range (VGND to VDDH) or a negative-polarity analog voltage range (VGND to VDDL) that is about half of the liquid crystal drive voltage range. In the case of a transistor having a low withstand voltage VDDT, for example, the gate insulating film can be made thin, and the output circuit composed of the transistor can be realized in a small area. In addition, the element interval can be narrowed by lowering the withstand voltage. In this manner, the data driver in FIG. 16 can be formed in a small area, which enables cost reduction.

According to the disclosure, even if a single conductive MOS transistor is used as an output selection switch that selectively outputs positive and negative voltage signals to a capacitive load, it is possible to restrict the generation of parasitic bipolar transistors parasitic to the MOS transistor and it is possible to reduce the withstand voltage of the MOS transistor.

Therefore, according to the disclosure, it is possible to realize an output circuit having a small area and high reliability when positive and negative voltage signals are selectively output.

What is claimed is:
1. An output circuit, comprising:
a positive voltage signal supply circuit that supplies a positive voltage signal having a voltage higher than a reference power supply voltage to a first node or cuts off supply of the positive voltage signal to the first node;
a negative voltage signal supply circuit that supplies a negative voltage signal having a voltage lower than the reference power supply voltage to a second node or cuts off supply of the negative voltage signal to the second node;
a first output terminal;
a first switch which is composed of a first PMOS transistor switch in which a source is connected to the first node and a drain is connected to the first output terminal, and connects the first output terminal and the first node when the first switch is turned on and cuts off connection between the first output terminal and the first node when the first switch is turned off;
a second switch which is composed of a first NMOS transistor switch in which a source is connected to the second node and a drain is connected to the first output terminal, and connects the first output terminal and the second node when the second switch is turned on and cuts off connection between the first output terminal and the second node when the second switch is turned off;
a third switch that applies the reference power supply voltage to the first node when the third switch is turned on and stops application of the reference power supply voltage to the first node when the third switch is turned off;
a fourth switch that applies the reference power supply voltage to the second node when the fourth switch is turned on and stops application of the reference power supply voltage to the second node when the fourth switch is turned off;
a first voltage control circuit that is connected to a gate of the first switch and controls the first switch such that the first switch is brought into an on state;
a second voltage control circuit that is connected to a gate of the second switch and controls the second switch such that the second switch is brought into an on state;
a first control device that is connected to the gate of the first switch and controls the first switch such that the first switch is brought into an off state;
a second control device that is connected to the gate of the second switch and controls the second switch such that the second switch is brought into an off state;
a third voltage control circuit that sets a voltage of the source or the drain of the first PMOS transistor switch as a first voltage and controls whether a second voltage obtained by shifting the level of the first voltage to a high potential side is supplied to a back gate of the first PMOS transistor switch or the reference power supply voltage is supplied to the back gate of the first PMOS transistor switch; and
a fourth voltage control circuit that sets a voltage of the source or the drain of the first NMOS transistor switch as a third voltage and controls whether a fourth voltage obtained by shifting the level of the third voltage to a low potential side is supplied to a back gate of the first NMOS transistor switch or the reference power supply voltage is supplied to the back gate of the first NMOS transistor switch.

2. The output circuit according to claim 1,
wherein the first output terminal has an output voltage range between the maximum value of the positive voltage signal and the minimum value of the positive voltage signal, and
at least the first and second switches are composed of transistors of a withstand voltage lower than the output voltage range.

3. The output circuit according to claim 1,
wherein the third voltage control circuit, when the first PMOS transistor switch is controlled such that the first PMOS transistor switch is brought into an on state, sets the voltage of the source or the drain of the first PMOS transistor switch as a first voltage and supplies a second voltage obtained by shifting the level of the first voltage to a high potential side to the back gate of the first PMOS transistor switch, and when the first PMOS transistor switch is controlled such that the first PMOS transistor switch is brought into an off state, supplies the reference power supply voltage to the back gate of the first PMOS transistor switch, and
wherein the fourth voltage control circuit, when the first NMOS transistor switch is controlled such that the first NMOS transistor switch is brought into an on state, sets the voltage of the source or the drain of the first NMOS transistor switch as a third voltage and supplies a fourth voltage obtained by shifting the level of the third voltage to a low potential side to the back gate of the first NMOS transistor switch, and when the first NMOS transistor switch is controlled such that the first NMOS transistor switch is brought into an off state, supplies the reference power supply voltage to the back gate of the first NMOS transistor switch.

4. The output circuit according to claim 1,
wherein the third voltage control circuit includes
a first load element comprising a first PMOS transistor and a second PMOS transistor and connected between the source or the drain of the first PMOS transistor switch and the back gate of the first PMOS transistor switch,
a first current source that sets a value of a current that flows through the first load element, and
a first back gate control switch that applies the reference power supply voltage to the back gate of the first PMOS transistor switch when the first back gate control switch is turned on, and stops application of the reference power supply voltage to the back gate of the first PMOS transistor switch when the first back gate control switch is turned off,
wherein, when the first PMOS transistor switch is controlled such that the first PMOS transistor switch is brought into in an on state, the first load element receives the voltage of the source or the drain of the first PMOS transistor switch as the first voltage, outputs a voltage obtained by shifting the level of the first voltage by a voltage difference based on the value of the current that flows through the first load element as the second voltage and supplies the second voltage to the back gate of the first PMOS transistor switch, and
wherein, when the first PMOS transistor switch is controlled such that the first PMOS transistor switch is brought into an off state, the first back gate control switch is turned on and supplies the reference power supply voltage to the back gate of the first PMOS transistor switch.

5. The output circuit according to claim 4,
wherein the first current source is connected between the back gate of the first PMOS transistor switch and a positive power supply voltage terminal that receives a positive power supply voltage,
wherein the first back gate control switch is connected between the back gate of the first PMOS transistor switch and a reference power supply voltage terminal that receives the reference power supply voltage,
wherein the first load element is composed of an MOS transistor having a diode connection configuration connected between the source or the drain of the first PMOS transistor switch and the back gate of the first PMOS transistor switch, or
a PMOS source follower transistor in which a gate receives the voltage of the source or the drain of the first PMOS transistor switch as the first voltage and a source is connected to the back gate of the first PMOS transistor switch.

6. The output circuit according to claim 4,
wherein the first current source is connected between the back gate of the first PMOS transistor switch and a positive power supply voltage terminal that receives a positive power supply voltage,
wherein the first back gate control switch is connected between the back gate of the first PMOS transistor switch and a reference power supply voltage terminal that receives the reference power supply voltage, and
wherein
the first PMOS transistor is configured such that a drain is connected to one of the source and the drain of the first PMOS transistor switch, a gate is connected to the other of the source and the drain of the first PMOS transistor switch, and a source is connected to the back gate of the first PMOS transistor switch, and
the second PMOS transistor is configured such that a drain is connected to the other of the source and the drain of the first PMOS transistor switch, a gate is connected to the one of the source and the drain of the first PMOS transistor switch, and a source is connected to the back gate of the first PMOS transistor switch.

7. The output circuit according to claim 1,
wherein the fourth voltage control circuit includes
a second load element comprising a first NMOS transistor and a second NMOS transistor and connected between the source or the drain of the first NMOS transistor switch and the back gate of the first NMOS transistor switch,
a second current source that sets a value of a current that flows through the second load element, and
a second back gate control switch that applies the reference power supply voltage to the back gate of the first NMOS transistor switch when the second back gate control switch is turned on and stops application of the reference power supply voltage to the back gate of the first NMOS transistor switch when the second back gate control switch is turned off,
wherein, when the first NMOS transistor switch is controlled such that the first NMOS transistor switch is brought into an on state, the second load element receives the voltage of the source or the drain of the first NMOS transistor switch as the third voltage, outputs a voltage obtained by shifting the level of the third voltage by a voltage difference based on the value of the current that flows through the second load element as the fourth voltage, and supplies the fourth voltage to the back gate of the first NMOS transistor switch, and
wherein, when the first NMOS transistor switch is controlled such that the first NMOS transistor switch is brought into an off state, the second back gate control switch is turned on, and the reference power supply voltage is supplied to the back gate of the first NMOS transistor switch.

8. The output circuit according to claim 7,
wherein the second current source is connected between the back gate of the first NMOS transistor switch and a negative power supply voltage terminal that receives a negative power supply voltage,
wherein the second back gate control switch is connected between the back gate of the first NMOS transistor switch and a reference power supply voltage terminal that receives the reference power supply voltage, and
wherein the second load element is composed of an MOS transistor having a diode connection configuration connected between the source or the drain of the first NMOS transistor switch and the back gate of the first NMOS transistor switch, or
an NMOS source follower transistor in which a gate receives the voltage of the source or the drain of the first NMOS transistor switch as the third voltage and a source is connected to the back gate of the first NMOS transistor switch.

9. The output circuit according to claim 7,
wherein the second current source is connected between the back gate of the first NMOS transistor switch and a negative power supply voltage terminal that receives a negative power supply voltage,
wherein the second back gate control switch is connected between the back gate of the first NMOS transistor switch and a reference power supply voltage terminal that receives the reference power supply voltage, and wherein the first NMOS transistor is configured such that a drain is connected to one of the source and the drain of the first NMOS transistor switch, a gate is connected to the other of the source and the drain of the first NMOS transistor switch, and a source is connected to the back gate of the first NMOS transistor switch, and the second NMOS transistor is configured such that a drain is connected to the other of the source and the drain of the first NMOS transistor switch, a source is connected to the one of the source and the drain of the first NMOS transistor switch, and a source is connected to the back gate of the first PMOS transistor switch.

10. The output circuit according to claim 1, further comprising a controller that performs activation and inactivation control of each of the first control device and the second control device such that the positive voltage signal and the negative voltage signal are switched at a predetermined timing and output from the first output terminal, on/off control of each of the third switch and the fourth switch, activation and inactivation control of each of the first voltage control circuit and the second voltage control circuit, control of a voltage supplied to the back gate of the first PMOS transistor switch by the third voltage control circuit, control of a voltage supplied to the back gate of the first NMOS transistor switch by the fourth voltage control circuit, and voltage supply/cut off control of each of the positive voltage signal supply circuit and the negative voltage signal supply circuit in conjunction.

11. The output circuit according to claim 10, wherein the controller sets a first period as a transient period for switching from the negative voltage signal to the positive voltage signal output from the first output terminal, a second period in which the positive voltage signal is output from the first output terminal, a third period as a transient period for switching from the positive voltage signal to the negative voltage signal output from the first output terminal, and a fourth period in which the negative voltage signal is output from the first output terminal, wherein, in the first period, supply of the positive voltage signal from the positive voltage signal supply circuit is cut off, supply of the negative voltage signal from the negative voltage signal supply circuit is cut off, the third switch and the fourth switch are both turned on, the first control device and the second control device are activated and inactivated, respectively, the first voltage control circuit and the second voltage control circuit are inactivated and activated, respectively, control is performed such that the reference power supply voltage is supplied from the third voltage control circuit to the back gate of the first PMOS transistor switch, control is performed such that a voltage obtained by shifting the level of the voltage of the source or the drain of the first NMOS transistor switch is supplied from the fourth voltage control circuit to the back gate of the first NMOS transistor switch, and thus the first PMOS transistor switch is turned off, the first NMOS transistor switch is turned on, and the reference power supply voltage is supplied to the first node and the second node and the first output terminal, wherein, in the second period, while supply of the negative voltage signal from the negative voltage signal supply circuit is continuously cut off, the positive voltage signal is supplied from the positive voltage signal supply circuit to the first node, the third switch and the fourth switch are turned off and on, respectively, the first control device and the second control device are inactivated and activated, respectively, the first voltage control circuit and the second voltage control circuit are activated and inactivated, respectively, control is performed such that a voltage obtained by shifting the level of the voltage of the source or the drain of the first PMOS transistor switch is supplied from the third voltage control circuit to the back gate of the first PMOS transistor switch, control is performed such that the reference power supply voltage is supplied from the fourth voltage control circuit to the back gate of the first NMOS transistor switch, and thus the first PMOS transistor switch is turned on, the first NMOS transistor switch is turned off, the positive voltage signal is supplied to the first output terminal via the first PMOS transistor switch, and the reference power supply voltage is supplied to the second node via the fourth switch, wherein, in the third period, supply of the negative voltage signal from the negative voltage signal supply circuit is continuously cut off, supply of the positive voltage signal from the positive voltage signal supply circuit is cut off, the third switch and the fourth switch are both turned on, the first control device and the second control device are continuously inactivated and activated, respectively, the first voltage control circuit and the second voltage control circuit are continuously activated and inactivated, respectively, control is performed such that a voltage obtained by shifting the level of the voltage of the source or the drain of the first PMOS transistor switch is continuously supplied from the third voltage control circuit to the back gate of the first PMOS transistor switch, control is performed such that the reference power supply voltage is continuously supplied from the fourth voltage control circuit to the back gate of the first NMOS transistor switch, and thus the first PMOS transistor switch is turned on, the first NMOS transistor switch is turned off, and the reference power supply voltage is supplied to the first node and the second node and the first output terminal, and wherein, in the fourth period, while supply of the positive voltage signal from the positive voltage signal supply circuit is continuously cut off, the negative voltage signal is supplied from the negative voltage signal supply circuit to the second node, the third switch and the fourth switch are turned on and off, respectively, the first control device and the second control device are activated and inactivated, respectively, the first voltage control circuit and the second voltage control circuit are inactivated and activated, respectively, control is performed such that the reference power supply voltage is supplied from the third voltage control circuit to the back gate of the first PMOS transistor switch, control is performed such that a voltage obtained by shifting the level of the voltage of the source or the drain of the first NMOS transistor switch is supplied from the fourth voltage control circuit to the back gate of the first NMOS transistor switch, and thus the first PMOS transistor switch is turned off, the first NMOS transistor switch is turned on, the negative voltage signal is supplied to the first output terminal via the first NMOS transistor switch, and the reference power supply voltage is supplied to the first node via the third switch.

12. The output circuit according to claim 1, comprising:
a second output terminal;
a third node and a fourth node;
a fifth switch which is composed of a second PMOS transistor switch in which a source is connected to the third node and a drain is connected to the second output terminal, and connects the second output terminal and the third node when the fifth switch is turned on, and cuts off connection between the second output terminal and the third node when the fifth switch is turned off;
a sixth switch which is composed of a second NMOS transistor switch in which a source is connected to the fourth node and a drain is connected to the second output terminal, and connects the second output terminal and the fourth node when the sixth switch is turned on and cuts off connection between the second output terminal and the fourth node when the sixth switch is turned off;
a seventh switch that applies the reference power supply voltage to the third node when the seventh switch is turned on and stops application of the reference power supply voltage to the third node when the seventh switch is turned off;
an eighth switch that applies the reference power supply voltage to the fourth node when the eighth switch is turned on and stops application of the reference power supply voltage to the fourth node when the eighth switch is turned off;
a fifth voltage control circuit that is connected to a gate of the fifth switch and controls the fifth switch such that the fifth switch is brought into an on state;
a sixth voltage control circuit that is connected to a gate of the sixth switch and controls the sixth switch such that the sixth switch is brought into an on state;
a third control device that is connected to a gate of the fifth switch and controls the fifth switch such that the fifth switch is brought into an off state;
a fourth control device that is connected to a gate of the sixth switch and controls the sixth switch such that the sixth switch is brought into an off state;
a seventh voltage control circuit that sets the voltage of the source or the drain of the second PMOS transistor switch as a fifth voltage, and controls whether a sixth voltage obtained by shifting the level of the fifth voltage to a high potential side is supplied to a back gate of the second PMOS transistor switch or the reference power supply voltage is supplied to a back gate of the second PMOS transistor switch; and
an eighth voltage control circuit that sets the voltage of the source or the drain of the second NMOS transistor switch as a seventh voltage, and controls whether an eighth voltage obtained by shifting the level of the seventh voltage to a low potential side is supplied to a back gate of the second NMOS transistor switch or the reference power supply voltage is supplied to a back gate of the second NMOS transistor switch,
wherein the positive voltage signal supply circuit controls supply or cut off of the positive voltage signal to the first node or the third node, and
wherein the negative voltage signal supply circuit controls supply or cut off of the negative voltage signal to the second node or the fourth node.

13. The output circuit according to claim 12,
wherein the controller performs
activation and inactivation control of the first control device to the fourth control device,
activation and inactivation control of each of the first voltage control circuit, the second voltage control circuit, the fifth voltage control circuit, and the sixth voltage control circuit, and
on/off control of each of the third switch, the fourth switch, the seventh switch, and the eighth switch, control of a voltage supplied to the back gates of the first PMOS transistor switch and the second PMOS transistor switch by the third voltage control circuit and the seventh voltage control circuit, respectively, control of a voltage supplied to the back gates of the first NMOS transistor switch and the second NMOS transistor switch by the fourth voltage control circuit and the eighth voltage control circuit, respectively, and voltage supply and cut off control of each of the positive voltage signal supply circuit and the negative voltage signal supply circuit in conjunction,
so that one of the positive voltage signal and the negative voltage signal is output from the first output terminal, the other of the positive voltage signal and the negative voltage signal is output from the second output terminal, and the polarity of the voltage signals output from the first output terminal and the second output terminal are switched at a predetermined timing.

14. The output circuit according to claim 1,
wherein the first voltage control circuit receives a voltage of the first node and supplies a voltage obtained by shifting the level of the voltage of the first node to a low voltage side to the gate of the first PMOS transistor switch, and
wherein the second voltage control circuit receives a voltage of the second node and supplies a voltage obtained by shifting the level of the voltage of the second node to a high voltage side to the gate of the first NMOS transistor switch.

15. The output circuit according to claim 14,
wherein the first voltage control circuit includes
a third load element connected between the first node and the gate of the first PMOS transistor switch, and
a third current source that sets a value of a current that flows through the third load element,
wherein, when the first PMOS transistor switch is controlled such that the first PMOS transistor switch is brought into an on state, the third load element supplies a voltage of which the level is shifted by a voltage difference with respect to the voltage of the first node based on the value of the current that flows through the third load element to the gate of the first PMOS transistor switch.

16. The output circuit according to claim 14,
wherein the second voltage control circuit includes
a fourth load element connected between the second node and the gate of the first NMOS transistor switch, and
a fourth current source that sets a value of a current that flows through the fourth load element,
wherein, when the first NMOS transistor switch is controlled such that the first NMOS transistor switch is brought into an on state, the fourth load element supplies a voltage of which the level is shifted by a voltage difference with respect to the voltage of the second node based on the value of the current that flows through the fourth load element to the gate of the first NMOS transistor switch.

17. The output circuit according to claim 1,
wherein the positive voltage signal has a voltage value that is higher than the reference power supply voltage and less than a predetermined positive power supply voltage, and the negative voltage signal has a voltage value that is lower than the reference power supply voltage and higher than a predetermined negative power supply voltage, and
wherein the first voltage control circuit receives the reference power supply voltage and a negative-polarity side low power supply voltage having a voltage value that is lower than the reference power supply voltage and higher than the negative power supply voltage, and selects and supplies one of the reference power supply voltage and the negative-polarity side low power supply voltage based on the voltage value of the positive voltage signal to the gate of the first PMOS transistor switch.

18. The output circuit according to claim 1,
wherein the positive voltage signal has a voltage value that is higher than the reference power supply voltage and less than a predetermined positive power supply voltage, and the negative voltage signal has a voltage value that is lower than the reference power supply voltage and higher than a predetermined negative power supply voltage, and wherein the second voltage control circuit receives the reference power supply voltage and a positive-polarity side low power supply voltage having a voltage value that is higher than the reference power supply voltage and lower than the positive power supply voltage, and selects and supplies one of the reference power supply voltage and the positive-polarity side low power supply voltage based on the voltage value of the negative voltage signal to the gate of the first NMOS transistor switch.

19. A display driver, comprising:
a plurality of output circuits according to claim 1,
wherein a plurality of gradation voltage signals having positive or negative voltage values for driving a plurality of data lines of a liquid crystal display panel are output from the plurality of output circuits.

20. A display device, comprising:
a display driver including a plurality of output circuits according to claim 1, and in which a plurality of gradation voltage signals having positive or negative voltage values are output from the plurality of output circuits; and
a liquid crystal display panel having a plurality of data lines that receive the plurality of gradation voltage signals.

* * * * *